US012748346B1

(12) United States Patent
Li

(10) Patent No.: US 12,748,346 B1
(45) Date of Patent: Sep. 29, 2026

(54) PROJECTION APPARATUS

(71) Applicant: Guangzhou Lihe Electronic Technology Co., Ltd., Guangzhou (CN)

(72) Inventor: Jialin Li, Zhuhai (CN)

(73) Assignee: Guangzhou Lihe Electronic Technology Co., Ltd., Guangzhou (CN)

( * ) Notice: Subject to any disclaimer, the term of this patent is extended or adjusted under 35 U.S.C. 154(b) by 0 days.

(21) Appl. No.: 19/373,852

(22) Filed: Oct. 30, 2025

(30) Foreign Application Priority Data

Sep. 18, 2025 (CN) ......................... 202522017767.1

(51) Int. Cl.

| | |
|---|---|
| ***G03B 21/20*** | (2006.01) |
| ***G03B 21/10*** | (2006.01) |
| ***G03B 21/14*** | (2006.01) |
| ***G03B 31/06*** | (2021.01) |
| ***G03B 37/04*** | (2021.01) |

(52) U.S. Cl.
CPC ........... *G03B 21/208* (2013.01); *G03B 21/10* (2013.01); *G03B 21/142* (2013.01); *G03B 21/145* (2013.01); *G03B 31/06* (2013.01); *G03B 37/04* (2013.01)

(58) Field of Classification Search
CPC .... G03B 21/10; G03B 21/142; G03B 21/145; G03B 21/208; G03B 31/00; G03B 31/02; G03B 31/06; G03B 37/00; G03B 37/04
See application file for complete search history.

(56) References Cited

U.S. PATENT DOCUMENTS

| | | | | |
|---|---|---|---|---|
| 11,099,469 B1 * | 8/2021 | Selfe | .................. | G03B 21/2066 |
| 11,512,833 B1 * | 11/2022 | Joseph | .................. | F21V 7/0025 |
| 2019/0104577 A1 * | 4/2019 | Miller | .................. | F21V 23/003 |

FOREIGN PATENT DOCUMENTS

| | | |
|---|---|---|
| CN | 103792770 A | 5/2014 |
| CN | 107896322 A | 4/2018 |
| CN | 113542700 A | 10/2021 |

* cited by examiner

*Primary Examiner* — Sultan Chowdhury
(74) *Attorney, Agent, or Firm* — JEEN IP LAW, LLC

(57) ABSTRACT

The present invention discloses a projection apparatus, including a first projection module, where the first projection module includes a first light emitter and an optical texture member. The optical texture member includes a plurality of textures and recesses, the plurality of textures are defined as a first texture and a second texture, a length of the first texture is d1, a length of the second texture is d2, and d1≥d2. The recess is located between the first texture and the second texture. Light emitted by the light emitter at least passes through the optical texture member to form projection areas. Positions of the plurality of projection areas are continuously changing and moving, making a projection more realistic.

10 Claims, 18 Drawing Sheets

PROJECTION APPARATUS

CROSS-REFERENCE TO RELATED APPLICATIONS

The present patent document claims the benefit of priority to patent application No. 2025220177671, filed Sep. 18, 2025, and entitled "PROJECTION APPARATUS," the entire contents of each of which are incorporated herein by reference.

TECHNICAL FIELD

The present invention relates to the technical field of projection apparatuses, and in particular, to a projection apparatus with multi-form light effects.

BACKGROUND

An existing projection apparatus includes a base, and a driving motor, a light source, a disc tray, a film disc, and a lens set that are mounted on the base. The film disc is mounted on the disc tray, and the motor drives the film disc to rotate. Light emitted by the light source sequentially passes through the film disc and the lens set. Alternatively, an existing lamp or planetarium is used as a device for creating ambiance, decorating the environment, or aiding sleep. Its basic principle usually is: illuminating a template or optical element (such as a Fresnel lens or grating sheet) with a star pattern through a light source (such as an LED); and then magnifying the star pattern by using an imaging lens and projecting it onto a distant surface, simulating a starry effect of a night sky.

However, existing projection solutions still have many limitations. First, most solutions can only project light spots of a single size, density, and brightness. An overall light effect appears dull and lacks three-dimensionality, and a scene is not realistic enough.

Therefore, it is necessary to design a new projection apparatus to overcome the problems above.

SUMMARY

To solve the problems faced by the Background, the present invention provides a projection apparatus whose optical texture member has a combination of textures and recesses.

To achieve the foregoing purpose, the present invention uses the following technical means.

A projection apparatus, comprising: a first projection module, comprising at least a first light emitter and an optical texture member located above the first light emitter, wherein the optical texture member comprises a plurality of textures disposed at intervals and a recess located between two adjacent textures, and the plurality of textures are defined as at least a first texture and a second texture; a length of the first texture is d1, a length of the second texture is d2, d1≥d2, and the recess is located between the first texture and the second texture; and light emitted by the first light emitter is reflected and/or refracted by the optical texture member to form a plurality of projection areas, and the plurality of projection areas form an ambient light effect; and a second projection module, comprising at least a second light emitter, a projection screen located above the second light emitter, and an imaging assembly, wherein light emitted by the second light emitter passes through the projection screen and the imaging assembly to form a lyric or pattern projection, wherein at least a part of the ambient light effect shuttles between two adjacent lyrics or between two adjacent lines of lyrics; or at least a part of the ambient light effect is arranged around a lyric or pattern projection; or the ambient light effect serves as an ambient background for the lyric or pattern projection, and the lyric or pattern projection does not overlap with the ambient light effect.

Further, the first projection module further comprises an optical imaging member located above the optical texture member, and light emitted by the first light emitter is refracted or reflected by the optical texture member and then passes through the optical imaging member to form the ambient light effect, wherein the ambient light effect moves from far to near over the lyric or pattern projection.

Further, the ambient light effect comprises a strong light area and a soft light area arranged around the strong light area, and the lyric or pattern projection overlaps with the soft light area.

Further, the projection apparatus further comprises an atmosphere assembly, the atmosphere assembly projects a pattern of stars, the moon, or the Milky Way, the lyric projection does not overlap with the moon projection, and the moon or star projection at least partially overlaps with the ambient light effect.

Further, a central axis of an optical imaging member of the first projection module is B1, a central axis of the imaging assembly is P, a minimum included angle formed between P and B1 is β, and a value range of β is 0°<β≤180°.

Further, the second projection module further comprises an optical distribution assembly located between the second light emitter and the projection screen, the optical distribution assembly comprises a Fresnel lens, a convex lens, or a condenser lens, and the projection screen is located between the optical distribution assembly and the imaging assembly, or central axes of the projection screen and the imaging assembly coincide with or are parallel to each other.

A projection apparatus, comprising: a base, comprising a first cavity and a second cavity; a first projection module, accommodated in the first cavity and comprising a first light emitter, an optical texture member located above the first light emitter, and an optical imaging member, wherein the optical texture member comprises a plurality of textures disposed at intervals and a recess located between two adjacent textures, and the plurality of textures are defined as at least a first texture and a second texture; a length of the first texture is d1, a length of the second texture is d2, d1≥d2, and the recess is located between the first texture and the second texture; and light emitted by the light emitter passes through the optical texture member to form a plurality of projection areas or light emitted by the light emitter is reflected and/or refracted by the optical texture member to form a plurality of projection areas, and the plurality of projection areas form an ambient light effect and a visual effect; and an audio module, accommodated in the second cavity, wherein the audio module emits sound to form an auditory effect, combining the ambient lighting effect with the auditory effect of the audio module to create a multi sensory fusion.

Further, the projection apparatus comprises two first projection modules having different projection directions, and the projection directions of the two first projection modules are arranged with an included angle, so that when light/shadow projection areas of the two first projection modules are located on a same plane, the light/shadow projection areas at least partially overlap or are arranged adjacently, and the two areas together form an extended continuous projection range.

Further, a central axis of an optical imaging member of one of first projection modules is defined as B1, a central axis of an optical imaging member of another first projection module is defined as B2, a minimum included angle formed between B1 and B2 is defined as θ, and $45° < θ < 170°$, so that ambient light effects of the two first projection modules partially overlap or are adjacent, to increase a projection range.

Further, the base comprises an accommodation cavity and a separator plate, the separator plate partitions the accommodation cavity into the first cavity and the second cavity, the first cavity and the second cavity do not communicate with each other, and the second cavity forms an independent sound cavity of the audio module.

Further, the optical imaging member is detachably mounted on the base; and the optical imaging member and the base form a snap-fit fastening structure, the base comprises a limiting portion arranged around a central axis A, the optical imaging member comprises a projection portion and a snap-fit portion connected to the projection portion, and the limiting portion is accommodated between the projection portion and the snap-fit portion to restrict the optical imaging member from being separated from the base; or the optical imaging member and the base form a magnetic fixing structure.

Further, the projection apparatus further comprises a fragrance assembly, a first projection module is configured to generate and project a projection representing an ambient atmosphere; the audio module is configured to play related lyric information; the fragrance assembly is configured to form an olfactory aroma; and a system mainboard is coupled to a first projection module, the audio module and the fragrance assembly, a visual atmosphere and an auditory sense are combined with an olfactory sense, to enhance an immersive feeling of the atmosphere.

A projection apparatus, comprising: a first projection module, wherein the first projection module comprises a first light emitter and an optical texture member located above the first light emitter, the optical texture member comprises a plurality of textures disposed at intervals and a recess located between two adjacent textures, and the plurality of textures are defined as at least a first texture and a second texture; a length of the first texture is d1, a length of the second texture is d2, $d1 \geq d2$, and the recess is located between the first texture and the second texture; and light emitted by the light emitter passes through the optical texture member to form a plurality of projection areas or light emitted by the light emitter is reflected and/or refracted by the optical texture member to form a plurality of projection areas, the plurality of projection areas form an ambient light effect, and positions of the plurality of projection areas are constantly changing and moving.

Further, the first projection module further comprises an optical imaging member located above the optical texture member; when the ambient light effect of the first projection module is projected onto a wall, ceiling, or floor in a dark environment, the plurality of projection areas are arranged at intervals, a non-projection area exists between two adjacent projection areas of some of the plurality of projection areas, and the non-projection area is formed by a background wall; and the projection area moves toward the non-projection area, and a projection position of the projection area gradually changes.

Further, at least a part of a light effect of the projection area moves toward the non-projection area, to gradually cover an area of the non-projection area; or at least a part of a light effect of the projection area moves toward the non-projection area, and an area of the non-projection area gradually changes to another position.

Further, the base comprises a projection port, the first projection module comprises the optical imaging member mounted on the projection port, the optical imaging member is located above the optical texture member, a light beam from the first light emitter passes through the optical texture member and the optical imaging member to form a projection light effect with a central strong light area and a peripheral soft light area, and a proportion of a projection area of the strong light area is greater than that of a projection area of the soft light area.

Further, the first projection module comprises an optical imaging member mounted above the optical texture member, the optical imaging member comprises a first contour surface arranged along a first direction and a second contour surface arranged along a second direction, the first contour surface is connected to the second contour surface, and the optical imaging member comprises a plurality of imaging lenses connected to the first contour surface.

Further, the first contour surface is an arc-shaped surface or is formed by splicing a plurality of polygonal surfaces, a separation line is formed between two adjacent imaging lenses, a distance between the separation line and the first contour surface is defined as d3, a distance between the imaging lens and the first contour surface is defined as d4, and d4 is greater than d3.

Further, $d3 \geq 0.5$ mm, and 1 mm$\leq d4 \leq$5.8 mm.

Further, a height difference between the first texture and its adjacent recess is defined as h1, a height difference between the second texture and its adjacent recess is defined as h2, and $h1 \geq h2$; or the optical texture member further comprises a third texture, a height difference between the first texture and its adjacent recess is defined as h1, a height difference between the second texture and its adjacent recess is defined as h2, a height difference between the third texture and its adjacent recess is defined as h3, values of h1, h2, and h3 are all different, or values of two of h1, h2, and h3 are the same.

Further, when the first projection module projects a long strip light effect pattern, a value range of h1 is 0.8 mm$\leq h1 \leq$2.6 mm; or when the first projection module projects a cloud or water ripple pattern, a value range of h1 is 0.2 mm$\leq h1 \leq$0.7 mm.

Further, a central axis of the optical imaging member 23 is defined as B1, a central axis of the first light emitter 21 is defined as B2, a central axis of the optical texture member 22 is defined as B3, B2 is parallel to or coincides with B1, B3 is parallel to or coincides with B2, and the B3 is parallel to or coincides with B1.

Compared with the prior art, the projection apparatus in the present invention has the following beneficial effects:

A first projection module includes a first light emitter and an optical texture member located above the first light emitter, the optical texture member includes a plurality of textures disposed at intervals and a recess located between two adjacent textures, and the plurality of textures are defined as at least a first texture and a second texture; a length of the first texture is d1, a length of the second texture is d2, $d1 \geq d2$, and the recess is located between the first texture and the second texture; and light emitted by the light emitter passes through the optical texture member to form a plurality of projection areas or light emitted by the light emitter is reflected and/or refracted by the optical texture member to form a plurality of projection areas, the plurality of projection areas form an ambient light effect, and positions of the plurality of projection areas are constantly changing and moving. Different texture lengths make the projection light effect diversified, and improve a stereoscopic feeling of a projection effect, making a projection more realistic.

REFERENCE NUMERALS

Embodiment 1

Figure 1:
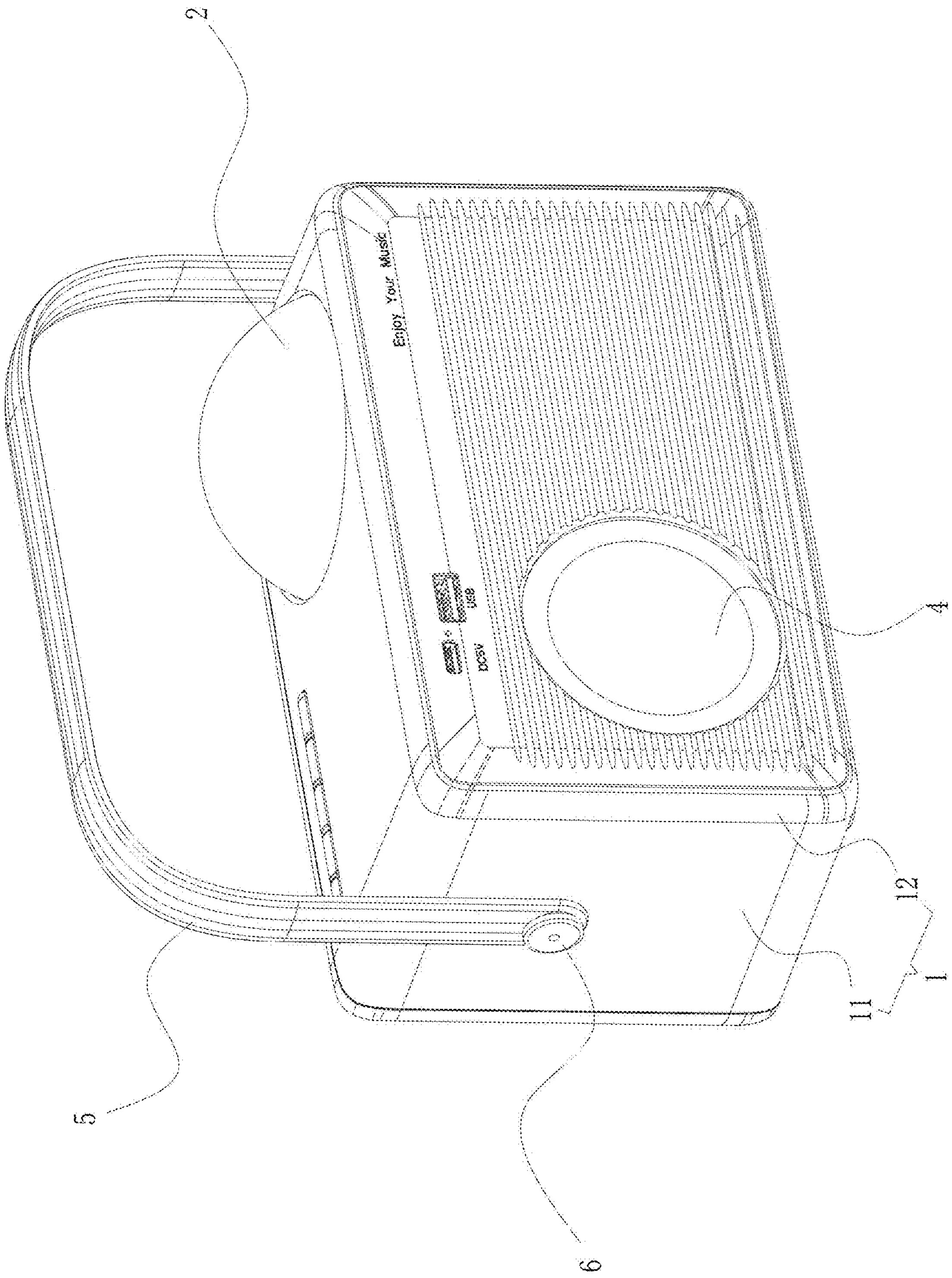
FIG. 1 is a three-dimensional diagram of a projection apparatus according to Embodiment 1 of the present invention.
Figure 2:
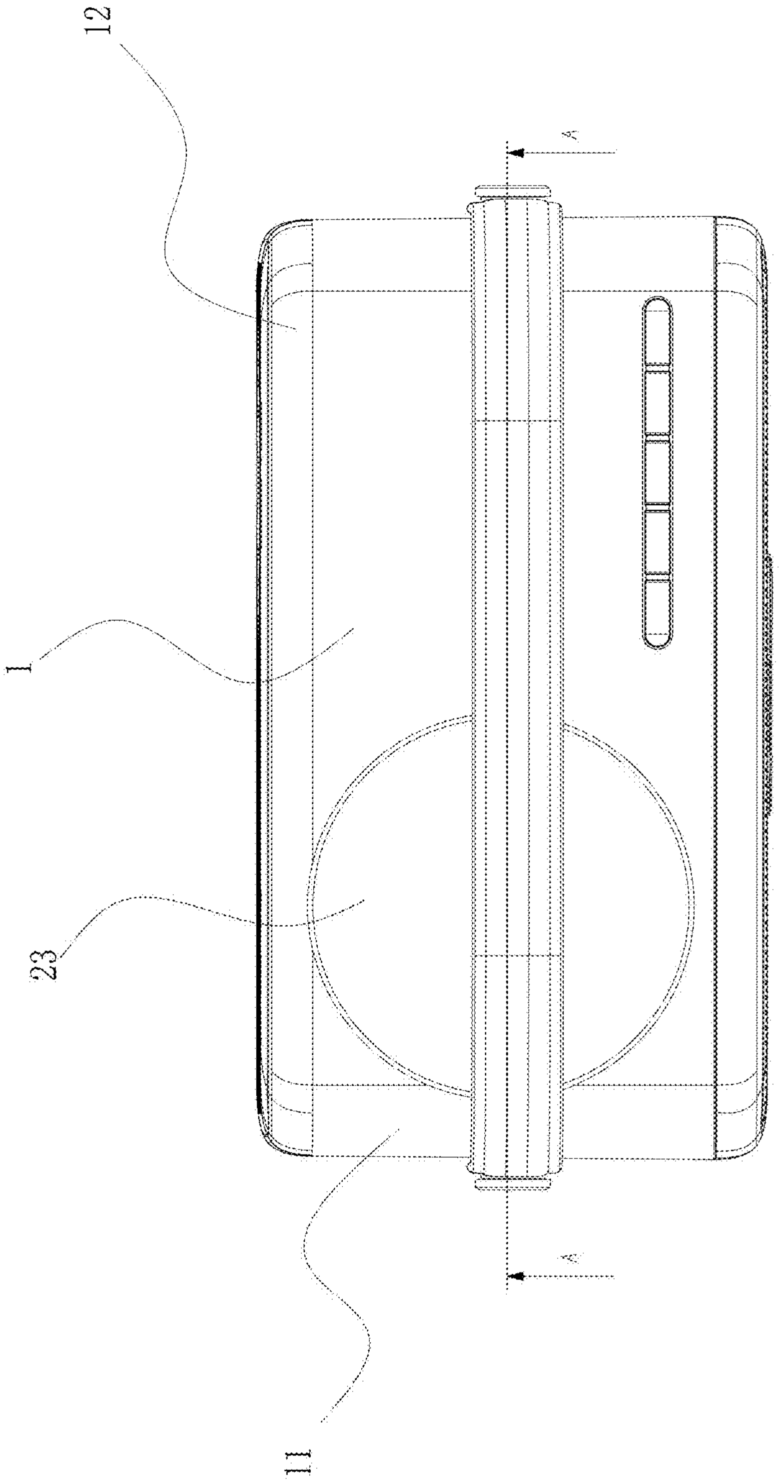
FIG. 2 is a top view of FIG. 1.

| | | | |
|---|---|---|---|
| Projection apparatus 100 | Base 1 | First housing 11 | Projection port 111 |
| Limiting portion 112 | Second housing 12 | Accommodation cavity 13 | First cavity 131 |
| Second cavity 132 | Separator plate 14 | Mounting hole 15 | First projection module 2 |
| First light emitter 21 | Optical texture member 22 | First texture 221 | Second texture 222 |
| Third texture 223 | Recess 224 | Optical imaging member 23 | Projection portion 231 |
| First contour surface 2311 | Second contour surface 2312 | Imaging lens 2313 | Cross-section 2314 |
| Separation line 2315 | Snap-fit portion 232 | Extension portion 2321 | Hook portion 2322 |
| Drive assembly 3 | Audio module 4 | Handle 5 | Sealing portion 51 |
| Fastener 6 | | | |

Embodiment 2

| | | | |
|---|---|---|---|
| Projection apparatus 100' | Base 1' | First projection module 2' | First light emitter 21' |
| Optical texture member 22' | First texture 221' | Second texture 222' | Third texture 223' |
| Recess 224' | Optical imaging member 23' | Projection portion 231' | First contour surface 2311' |
| Second contour surface 2312' | Imaging lens 2313' | Cross-section 2314' | Separation line 2315' |
| Flange 232' | Drive assembly 3' | Audio module 4' | |

Embodiment 3

| | | | |
|---|---|---|---|
| Projection apparatus 100" | Base 1" | First housing 11" | Projection port 111" |
| Accommodation cavity 12" | First cavity 121" | Second cavity 122" | First projection module 2" |
| First light emitter 21" | Optical texture member 22" | First texture 221" | Second texture 222" |
| Third texture 223" | Recess 224" | Optical imaging member 23" | Projection portion 231" |
| First contour surface 2311" | Second contour surface 2312" | Imaging lens 2313" | Cross-section 2314" |
| Separation line 2315" | Flange 232" | Second projection module 3" | Second light emitter 31" |
| Optical distribution assembly 32" | Projection screen 33" | Heat sink 34" | Imaging assembly 35" |
| Audio module 4" | Drive assembly 5" | Atmosphere assembly 6" | Fragrance assembly 7" |

DETAILED DESCRIPTION OF THE EMBODIMENTS

For better understanding of the purpose, structure, features, functions, and the like of the present invention, the present invention is further described with reference to the accompanying drawings and description of embodiments.

As shown in FIG. 1 to FIG. 7, a projection apparatus 100 in Embodiment 1 of the present invention includes a base 1, and a first projection module 2, an audio module 4, a handle 5, and a fastener 6 that are mounted on the base 1.

Figure 3:
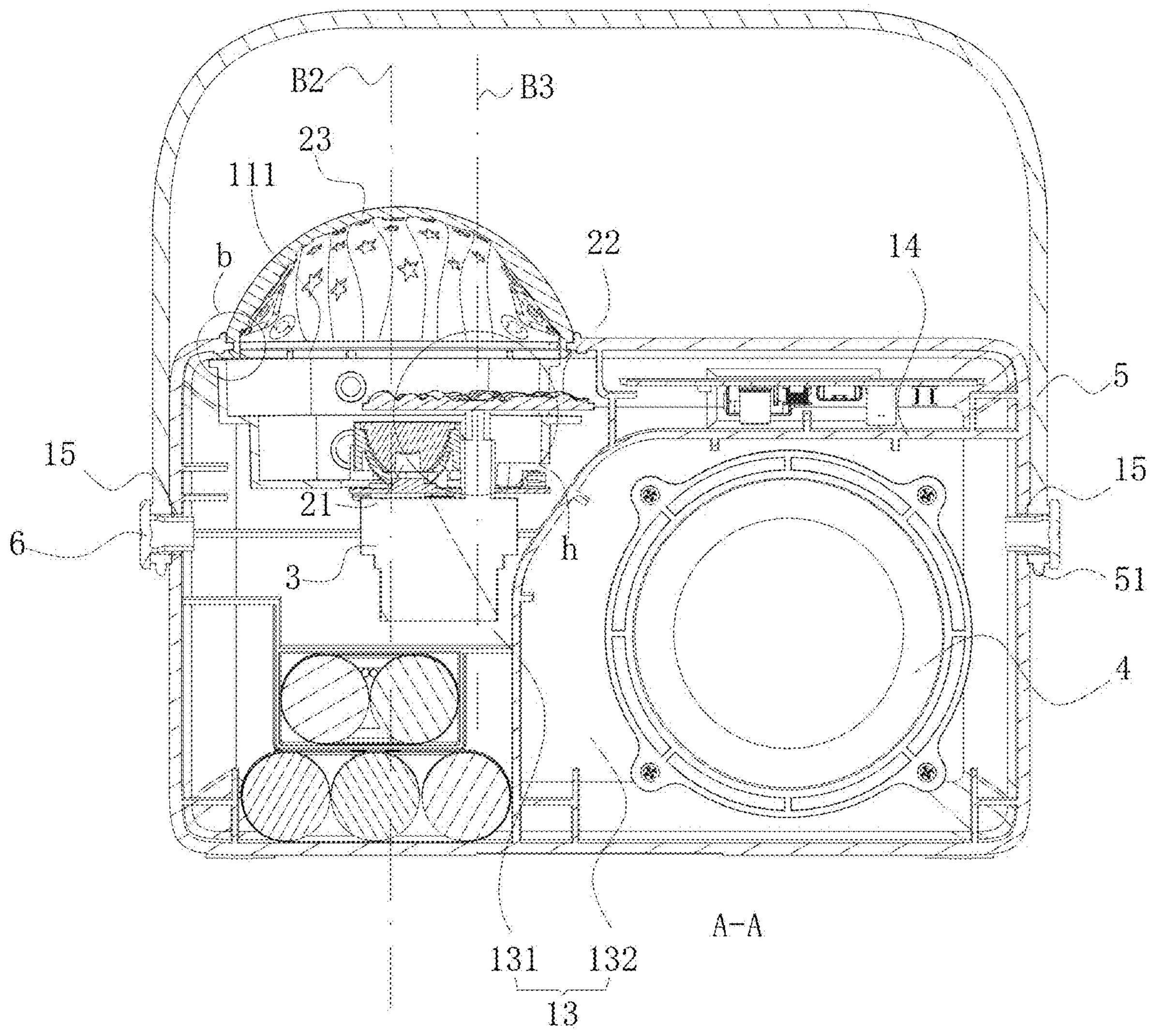
FIG. 3 is a sectional view of FIG. 2 along a section line A-A.

As shown in FIG. 1 and FIG. 3, the base 1 includes an accommodation cavity 13, and a first housing 11 and a second housing 12 that form the accommodation cavity 13. The first housing 11 and the second housing 12 are fastened to each other in a front-back direction. The base 1 includes a separator plate 14 that partitions the accommodation cavity 13 into a first cavity 131 and a second cavity 132. The first cavity 131 and the second cavity 132 do not communicate with each other. The base 1 includes a projection port 111 and two mounting holes 15 that communicate with the accommodation cavity 13. The projection port 111 communicates with the first cavity 131 in an up-down direction, and the projection port 111 extends upwards through a first housing 11. One mounting hole 15 is disposed in communication with the first cavity 131, and the other mounting hole 15 is disposed in communication with the second cavity 132. The base 1 further includes a limiting portion 112 disposed around a central axis A of the projection port 111.

Figure 4:
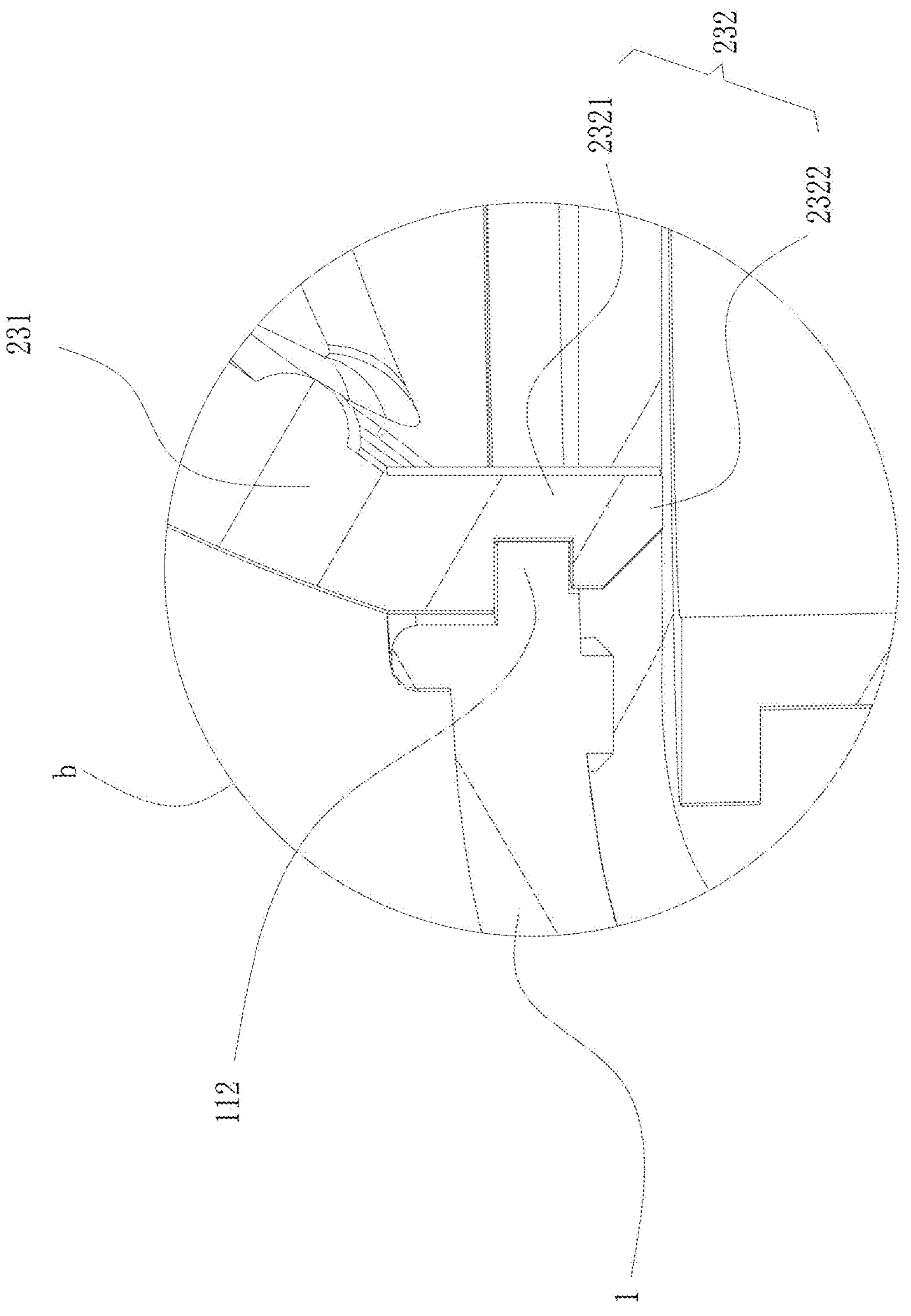
FIG. 4 is a partial enlarged view of b in FIG. 3.
Figure 5:
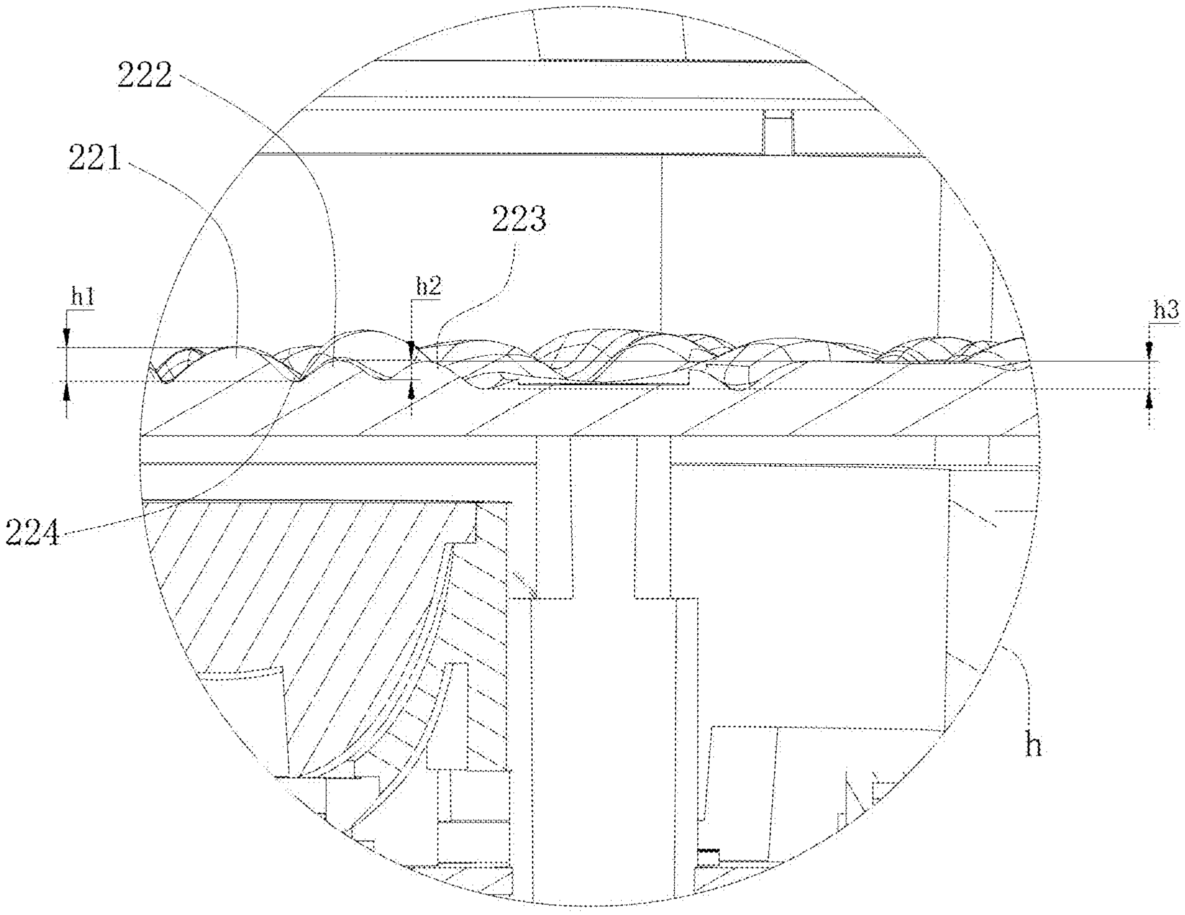
FIG. 5 is a partial enlarged view of h in FIG. 3.
Figure 6:
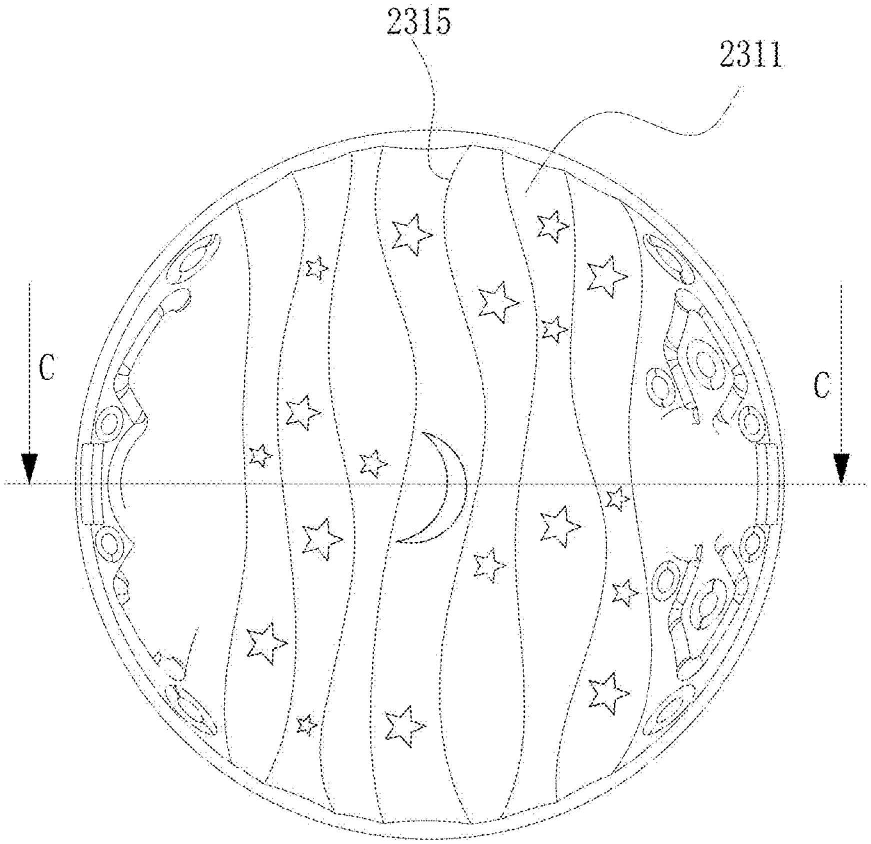
FIG. 6 is a bottom view of an optical imaging member of FIG. 1.
Figure 7:
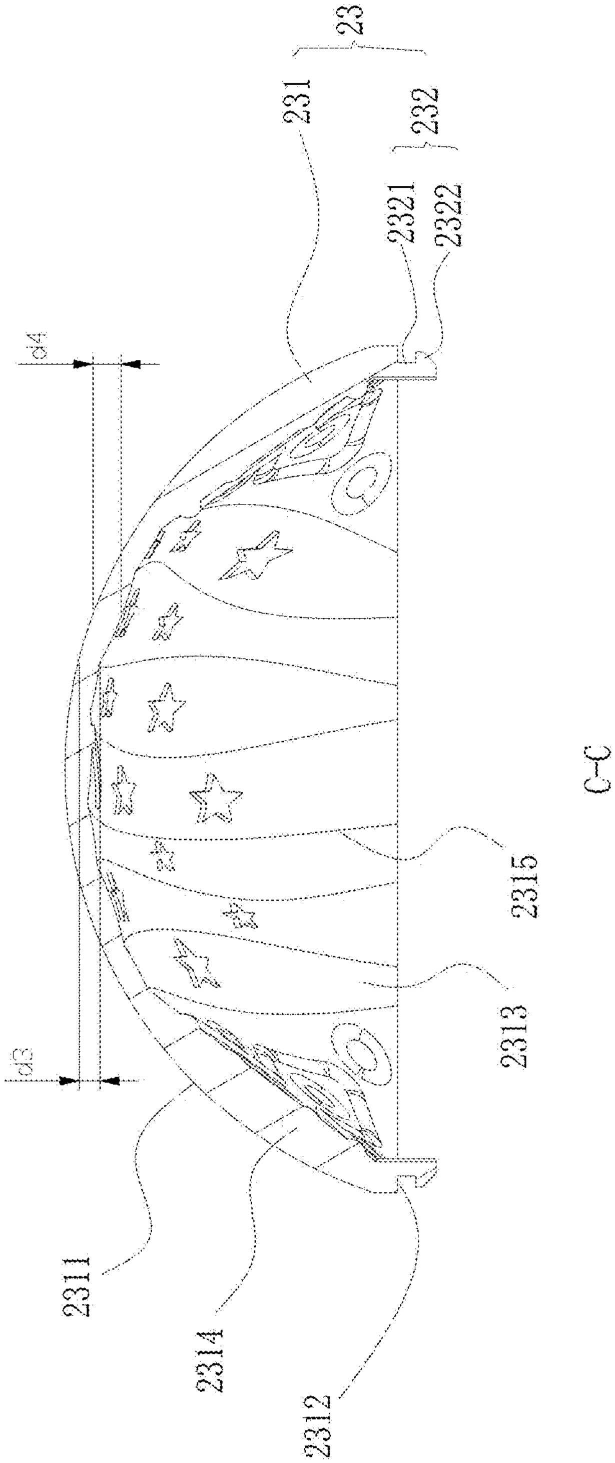
FIG. 7 is a sectional view of FIG. 6 along a section line C-C.

As shown in FIG. 3, FIG. 4, and FIG. 5, a central axis of the first projection module 2 is defined as P1. The first projection module 2 is accommodated in the first cavity 131. The first projection module 2 includes at least a first light emitter 21 and an optical texture member 22 located above the first light emitter 21. The first light emitter 21 is disposed as a lamp bead. The optical texture member 22 includes at least a plurality of first textures 221, a plurality of second textures 222, a plurality of third textures 223, and a plurality of recess 224 that are disposed at intervals. The recess 224 is located between the first texture 221 and the second texture 222, or the recess 224 is located between the second texture 222 and the third texture 223. A length of the first texture 221 is d1, a length of the second texture 222 is d2, and d1≥d2. Herein, d1 and d2 are lengths of convex textures, and during measurement, a caliper may be placed at the recess 224 at both ends of a convex texture, to obtain a length of the texture. The values of d1 and d2 measured should meet the requirements of the ratio relationship). A height difference between the first texture 221 and its adjacent recess 224 is defined as h1, a height difference between the second texture 222 and its adjacent recess 224 is defined as h2, and h1≥h2. Alternatively, a height difference between the third texture 223 and its adjacent recess 224 is defined as h3, where h1, h2, and h3 are different from each other, or two of h1, h2, and h3 are the same (for details, refer to FIG. 5). The height difference between the texture and the recess may be a height difference between any position of the texture and the recess, provided that the foregoing relationship is met. Light emitted by the first light emitter 21 is reflected and/or refracted by the optical texture member, to form a plurality of projection areas, and the plurality of projection areas form an ambient light effect. The plurality of projection areas refer to definition of a light effect projection formed by a light beam being reflected and/or refracted by the optical texture member as a plurality of projection areas. The optical texture member may be configured as a texture sheet or a reflector with particles. When a light beam from the first light emitter 21 passes through the texture sheet, light refraction occurs, or when a light beam from the first light emitter 21 passes through the reflector with particles, light reflection occurs. In this embodiment, the first projection module 2 includes the first light emitter 21, the optical texture member 22 located above the first light emitter 21, and at least one optical imaging member 23 located above the optical texture member 22. The optical imaging member 23 is an optical lampshade or an optical lens. A central axis of the optical imaging member 23 is defined as B1, a central axis of the first light emitter 21 is defined as B2, and a central axis of the optical texture member 22 is defined as B3. B2 is parallel to or coincides with B1, B3 is parallel to or coincides with B2, and B3 is parallel to or coincides with B1. When the first projection module 2 projects a long strip light effect pattern, a value range of h1 is 0.8 mm≤h1≤2.6 mm; or when the first projection module 2 projects a cloud or water ripple pattern, a value range of h1 is 0.2 mm≤h1≤0.7 mm. The optical imaging member 23 is detachably mounted on the projection port 111 to meet requirements of users for different projection light effects. The optical imaging member 23 and the base 1 form a snap-fit fastening structure. The optical imaging member 23 includes a projection portion 231 and a snap-fit portion 232 connected to the projection portion 231. The snap-fit portion 232 includes an extension portion 2321 connected to the projection portion 231 and a hook portion 2322. The snap-fit portion 232 is at least partially accommodated in the projection port 111 and the accommodation cavity 13. The projection portion 231 abuts against the limiting portion 112 downward, and the hook portion 2322 abuts against the limiting portion 112 upward. The limiting portion 112 is accommodated between the projection portion 231 and the hook portion 2322 to restrict the optical imaging member 23 from being separated from the base 1. In another embodiment, the optical imaging member 23 and the base 1 form a magnetic fastening structure. The projection portion 231 includes a first contour surface 2311 arranged along a first direction and a second contour surface 2312 arranged along a second direction. The first contour surface 2311 is an outer surface of an optical lampshade or an optical lens. The first contour surface 2311 is connected to the second contour surface 2312. The optical imaging member 23 includes a plurality of imaging lenses 2313 connected to the first contour surface 2311. The first contour surface 2311 is an arc-shaped surface or is formed by splicing a plurality of polygonal surfaces. A separation line 2315 is formed between two adjacent imaging lenses 2313. A distance between the separation line 2315 and the first contour surface 2311 is defined as d3, a distance between the imaging lens 2313 and the first contour surface 2311 is defined as d4, and d4 is greater than d3. d3≥0.5 mm, and 1 mm≤d4≤5.8 mm. Values of d3 and d4 may be specifically obtained through measurement after the optical imaging member 23 is cut to form a cross-section 2314 (for details, refer to FIG. 7), which may be a cross-section at any location of the imaging lens. Light emitted by the first light emitter 21 is reflected and/or refracted by the optical texture member and then passes through the optical imaging member 23, to form a plurality of projection areas, and the plurality of projection areas form an ambient light effect. The plurality of projection areas refer to definition of a light effect projection formed by a light beam being reflected and/or refracted by the optical texture member and then passing through the optical imaging member 23 as a plurality of projection areas. A drive assembly 3 drives the optical texture member 22 to rotate. When an ambient light effect of the first projection module 2 is projected onto a wall, ceiling, or floor in a dark environment, a plurality of projection areas are arranged at intervals, a non-projection area is provided between two adjacent projection areas of some of the plurality of projection areas, and the non-projection area is formed by a background wall; and some projection areas and some non-projection areas are alternately arranged, the projection area moves toward the non-projection area, and a projection position of the projection area gradually changes. A reason for forming the non-projection area is that a part of the light effect is totally reflected in a part of the optical texture member 22, so that a texture at this position does not form an outward projection, and at this position, a color of the wall, ceiling or floor itself is formed. The ambient light effect includes a strong light area and a soft light area arranged around the strong light area. A light beam from the first light emitter 21 passes through the optical texture member and the optical imaging member 23 to form a projection light effect with a central strong light area and a peripheral soft light area, and a proportion of a projection area of the strong light area is greater than that of a projection area of the soft light area.

As shown in FIG. 3, the audio module 4 is accommodated in the second cavity 132, and the second cavity 132 forms an independent sound cavity for the audio module 4 to improve sound quality. The handle 5 includes a through hole and a sealing portion 51 disposed around the through hole. The fastener 6 passes through the through hole and the mounting hole 15 to fasten the handle 5 to the base 1. The base 1 and the fastener 6 jointly clamp the sealing portion 51.

As shown in FIG. 8 to FIG. 12, a projection apparatus 100' in Embodiment 2 of the present invention includes a base 1', and two first projection modules 2', a drive assembly 3' and an audio module 4' that are mounted on the base 1'.

Figure 8:
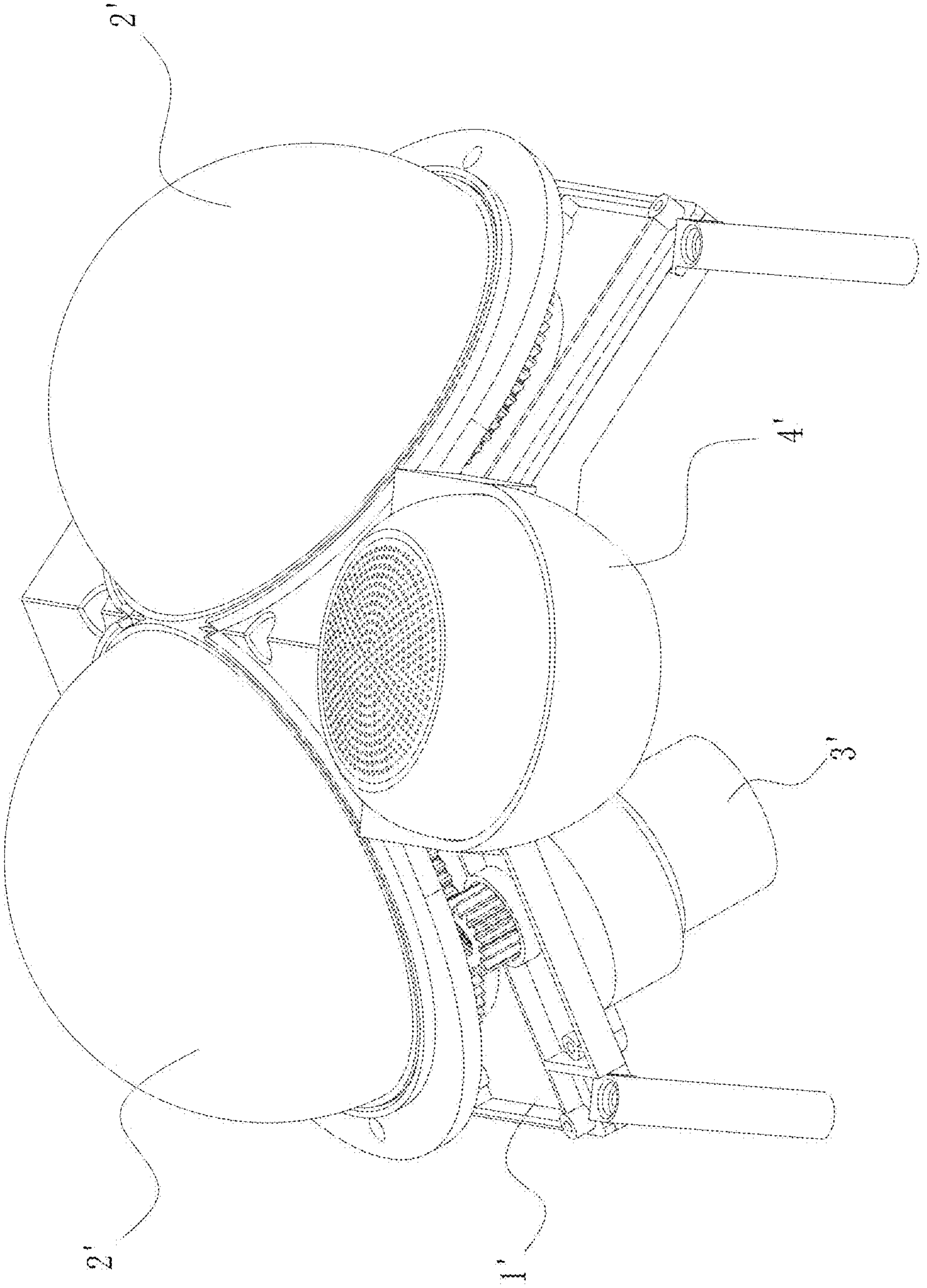
FIG. 8 is a three-dimensional diagram of a projection apparatus according to Embodiment 2 of the present invention.
Figure 9:
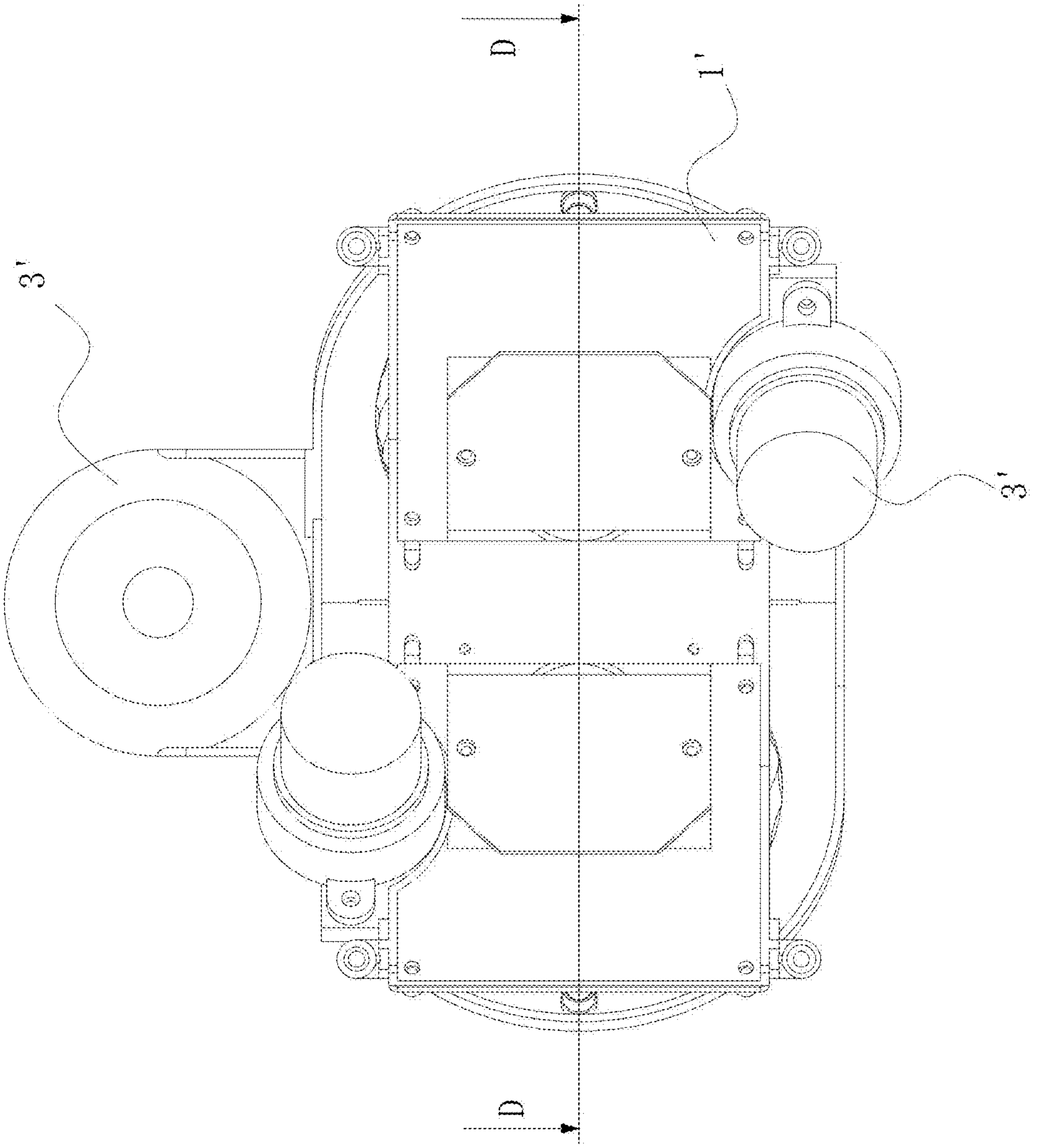
FIG. 9 is a bottom view of FIG. 8.
Figure 10:
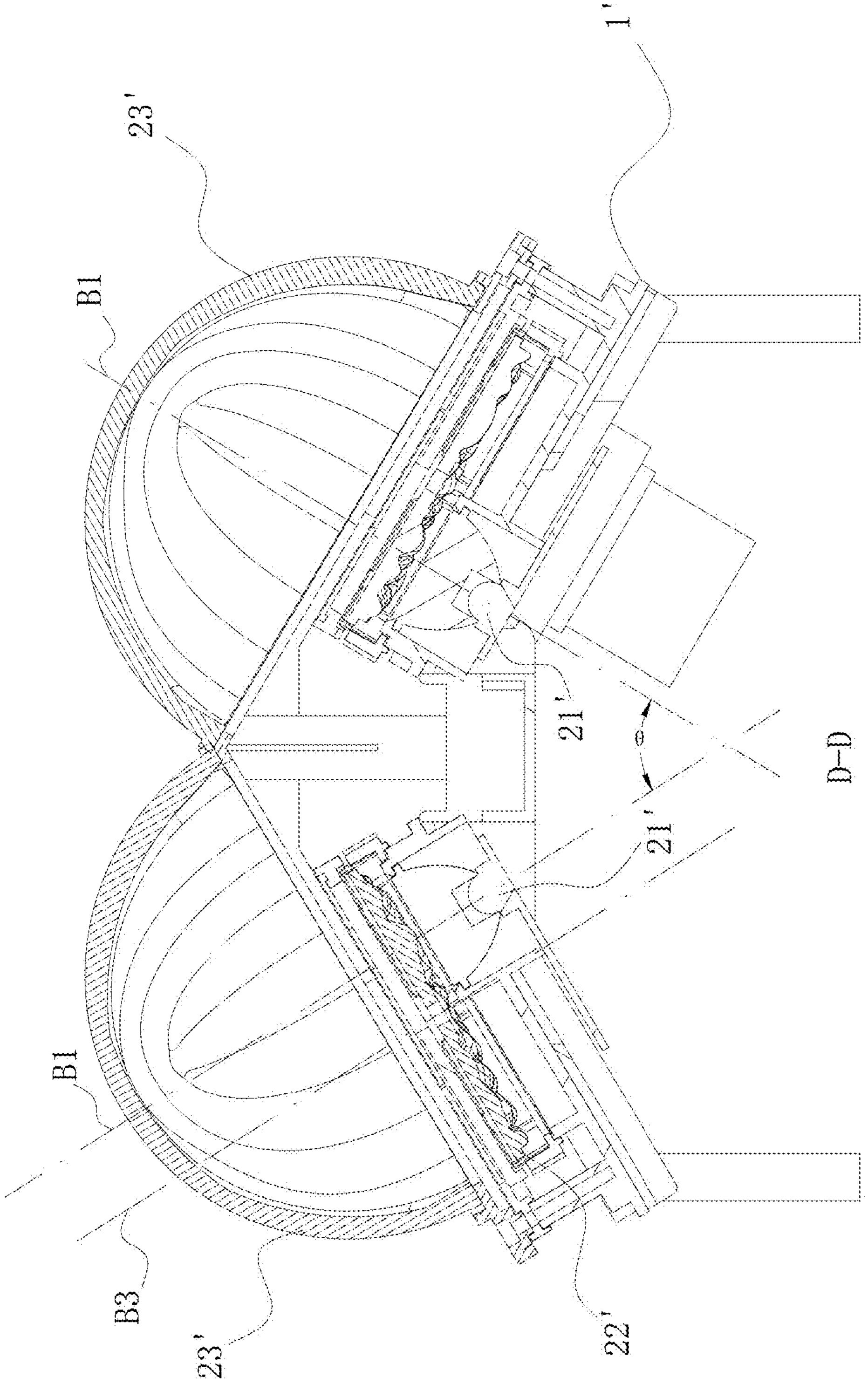
FIG. 10 is a sectional view of FIG. 9 along a sectional line D-D.
Figure 12:
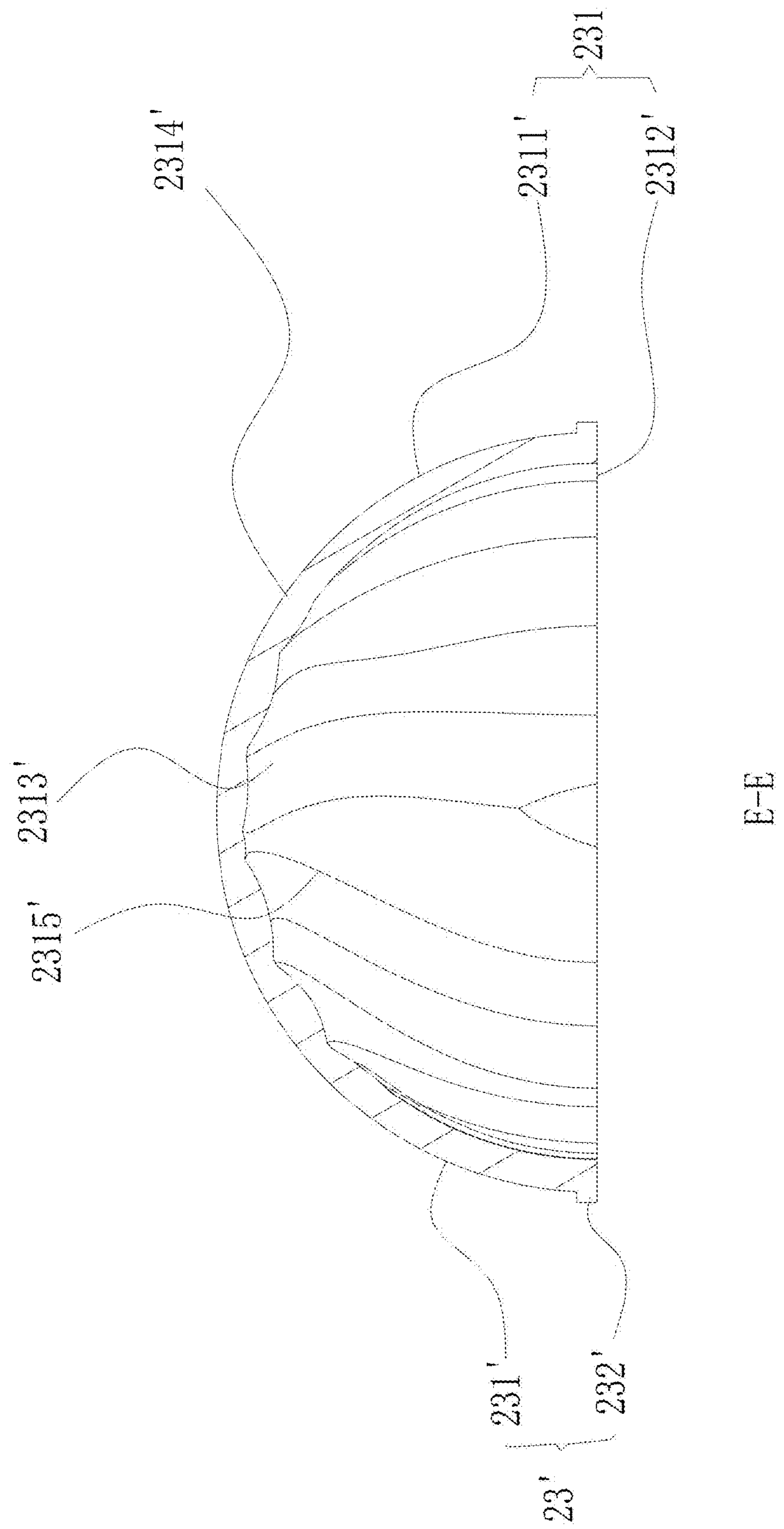
FIG. 12 is a sectional view of FIG. 11 along a section line E-E.

As shown in FIG. 8, FIG. 10, and FIG. 12, projection directions of the two first projection modules 2' are different, and the projection directions of the two first projection modules 2' are at an included angle, so that when located on a same plane, two light/shadow projection areas of the two first projection modules 2' at least partially overlap or are arranged adjacently, and the two areas together form an extended continuous projection range. The first projection module 2' includes at least a first light emitter 21 and an optical texture member 22' located above the first light emitter 21'. The first light emitter 21' is disposed as a lamp bead. The optical texture member 22' includes a plurality of first textures 221', a plurality of second textures 222', a plurality of third textures 223', and a plurality of recess 224' that are disposed at intervals. The recess 224' is located between the first texture 221' and the second texture 222', or the recess 224' is located between the second texture 222' and the third texture 223'. A length of the first texture 221' is d1, a length of the second texture 222' is d2, and $d1 \geq d2$. Herein, d1 and d2 are lengths of convex textures, and during measurement, a caliper may be placed at the recess 224' at both ends of a convex texture, to obtain a length of the texture. The values of d1 and d2 measured should meet the requirements of the ratio relationship. A height difference between the first texture 221' and its adjacent recess 224' is defined as h1, a height difference between the second texture 222' and its adjacent recess 224' is defined as h2, and $h1 \geq h2$. Alternatively, a height difference between the third texture 223' and its adjacent recess 224' as h3, where h1, h2, and h3 are different from each other, or two of h1, h2, and h3 are the same (Refer to FIG. 10 for details.). The measurement methods for h1, h2, and h3 are the same as Embodiment 1. Light emitted by the first light emitter 21' is reflected and/or refracted by the optical texture member, to form a plurality of projection areas, and the plurality of projection areas form an ambient light effect. The plurality of projection areas refer to definition of a light effect projection formed by a light beam being reflected and/or refracted by the optical texture member as a plurality of projection areas. The optical texture member may be configured as a texture sheet or a reflector with particles. When a light beam from the first light emitter 21' passes through the texture sheet, light refraction occurs, or when a light beam from the first light emitter 21' passes through the reflector with particles, light reflection occurs. In this embodiment, the first projection module 2' includes the first light emitter 21', the optical texture member 22' located above the first light emitter 21', and at least one optical imaging member 23' located above the optical texture member 22'. When the first projection module 2' projects a long strip light effect pattern, a value range of h1 is $0.8\ \text{mm} \leq h1 \leq 2.6\ \text{mm}$; or when the first projection module 2' projects a cloud or water ripple pattern, a value range of h1 is $0.2\ \text{mm} \leq h1 \leq 0.7\ \text{mm}$. The height difference between the texture and the recess may be a height difference between any position of the texture and the recess, provided that the foregoing relationship is met. The optical imaging member 23' is an optical lampshade or an optical lens. A central axis of an imaging member 23' of one of first projection modules 2' is defined as B1, a central axis of an imaging member 23' of another first projection module 2' is defined as C1', a minimum included angle formed between B1 and C1 is defined as θ, and $20° < \theta < 170°$, so that ambient light effects of the two first projection modules 2' partially overlap or are adjacent, to increase a projection range. A central axis of a first light emitter 21' of one of the first projection modules 2' is defined as B2, and a central axis of the optical texture member 22' is defined as B3'. The first light emitter 21' includes a lamp board and a lamp bead. B1 coincides with or is parallel to B2, and B3' is parallel to or coincides with B1. The projection apparatus 100' further includes a motor assembly driving the two first projection modules 2'. One of the first projection modules 2' forms a first projection light effect, and the other of the first projection modules forms a second projection light effect. A dynamic moving direction of at least a part of the first projection light effect is opposite to or the same as a dynamic moving direction of at least a part of the second projection light effect, and the two light effects shuttle and merge with each other at an intersection of the two light effects or are arranged adjacent to each other.

Figure 11:
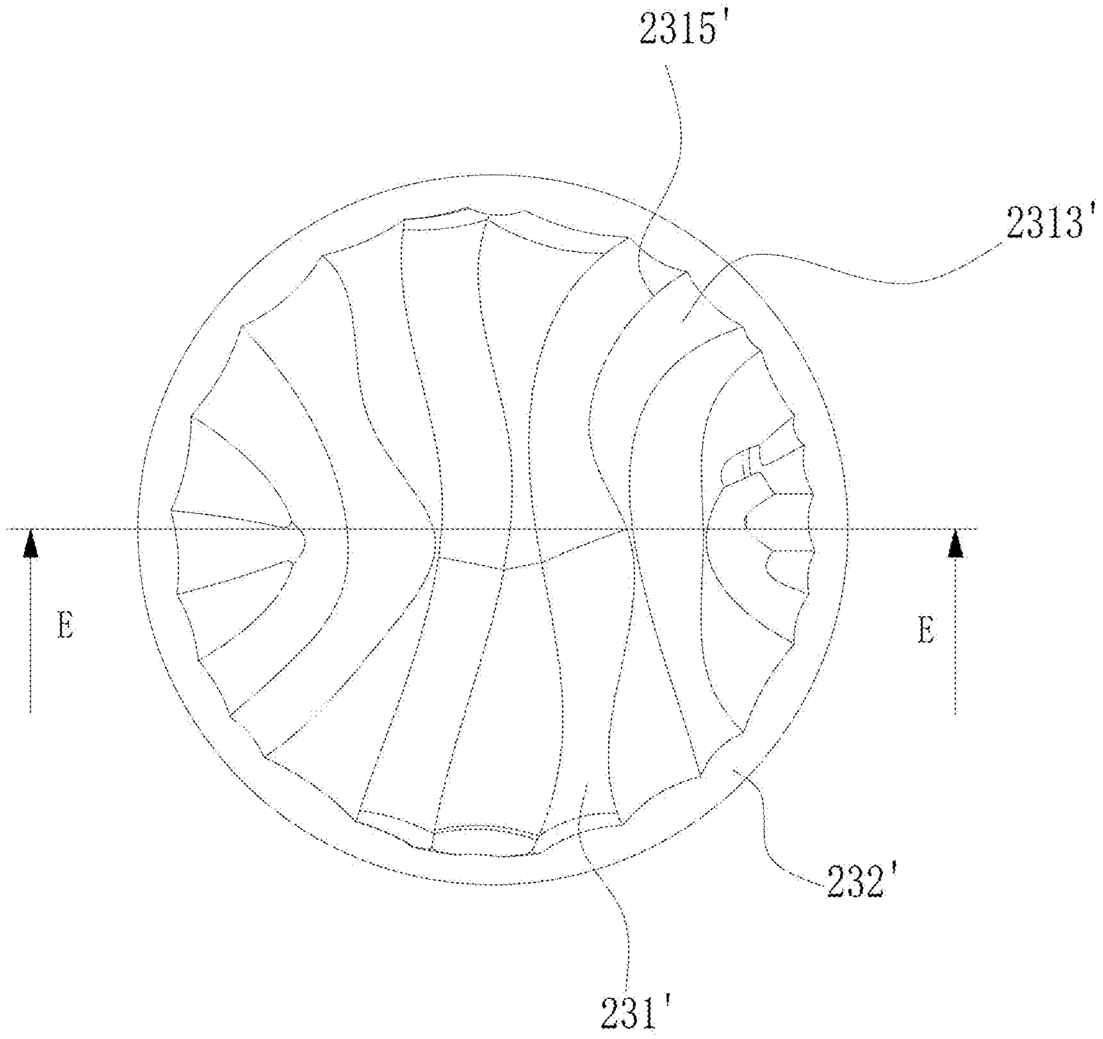
FIG. 11 is a bottom view of an optical imaging member of FIG. 8.

As shown in FIG. 10, FIG. 11, and FIG. 12, the optical imaging member 23' includes a projection portion 231' and a flange 232' disposed around the projection portion 231'. The projection portion 231' includes a first contour surface 2311' arranged along a first direction and a second contour surface 2312' arranged along a second direction. The first contour surface 2311' is an outer surface of an optical lampshade or an optical lens. The first contour surface 2311' is connected to the second contour surface 2312'. The optical imaging member 23' includes a plurality of imaging lenses 2313' connected to the first contour surface 2311'. The first contour surface 2311' is an arc-shaped surface or is formed by splicing a plurality of polygonal surfaces. Some imaging lenses 2313' of one optical imaging member 23' are axially symmetric with some imaging lenses 2313' of the other optical imaging member 23'. A separation line 2315' is formed between two adjacent imaging lenses 2313'. A distance between the separation line 2315' and the first contour surface 2311' is defined as d3, a distance between the imaging lens 2313' and the first contour surface 2311' is defined as d4, and d4 is greater than d3. $d3 \geq 0.5\ \text{mm}$, and $1\ \text{mm} \leq d4 \leq 5.8\ \text{mm}$. Values of d3 and d4 may be specifically obtained through measurement after the optical imaging member 23' is cut to form a cross-section 2314', which may be a cross-section at any location of the imaging lens 2313'. Light emitted by the first light emitter 21' is reflected and/or refracted by the optical texture member and then passes through the optical imaging member 23', to form a plurality of projection areas, and the plurality of projection areas form an ambient light effect. The plurality of projection areas refer to definition of a light effect projection formed by a light beam being reflected and/or refracted by the optical texture member and then passing through the optical imaging member 23' as a plurality of projection areas. The drive assembly 3' drives the optical texture member 22' to rotate. When an ambient light effect of the first projection module 2' is projected onto a wall, ceiling, or floor in a dark environment, a projected light effect area includes a plurality of non-projection areas and a plurality of projection areas. At least some of the projection areas and some of the non-projection areas are alternately arranged, the projection area moves toward the non-projection area, and a projection position of the projection area gradually changes. A reason for forming the non-projection area is that a part of the light effect is totally reflected in a part of the optical texture member 22', so that a texture at this position does not form an outward projection, and at this position, a color of the wall, ceiling or floor itself is formed. The ambient light effect includes a strong light area and a soft light area arranged around the strong light area. A light beam from the first light emitter 21' passes through the optical texture member and the optical imaging member 23' to form a projection light effect with a central strong light area and a peripheral soft light area, and a proportion of a projection area of the strong light area is greater than that of a projection area of the soft light area.

As shown in FIG. 8, the audio module 4' is configured to play related lyric information, forming a combination of an auditory effect and a visual effect of the ambient light effect, and enhancing an immersive feeling of the atmosphere.

As shown in FIG. 13 to FIG. 18, a projection apparatus 100" in Embodiment 3 of the present invention includes a base 1", and a first projection module 2", a second projection module 3", an audio module 4", a drive assembly 5", an atmosphere assembly 6", and a fragrance assembly 7" that are mounted on the base 1".

Figure 13:
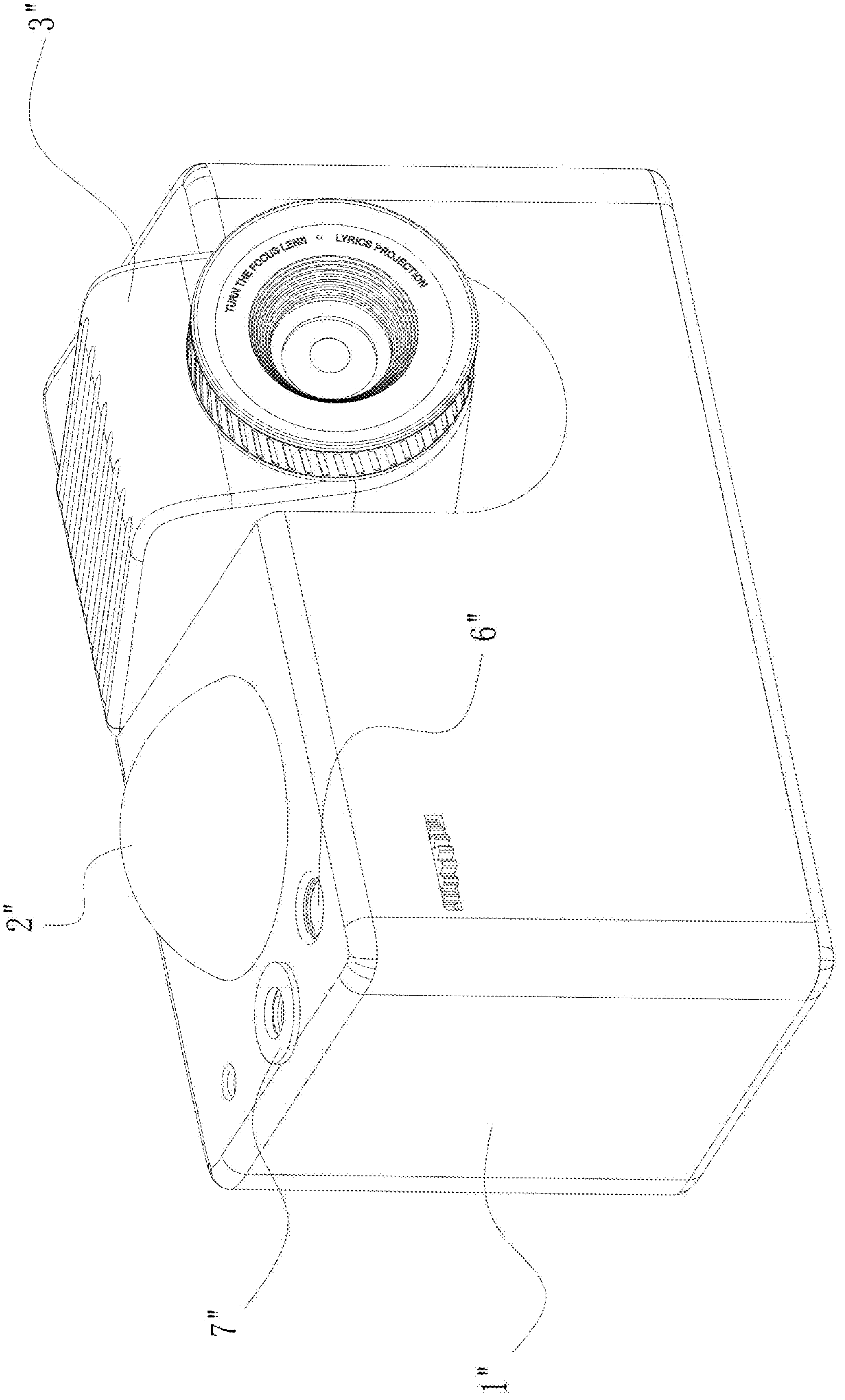
FIG. 13 is a three-dimensional diagram of a projection apparatus according to Embodiment 3 of the present invention.
Figure 16:
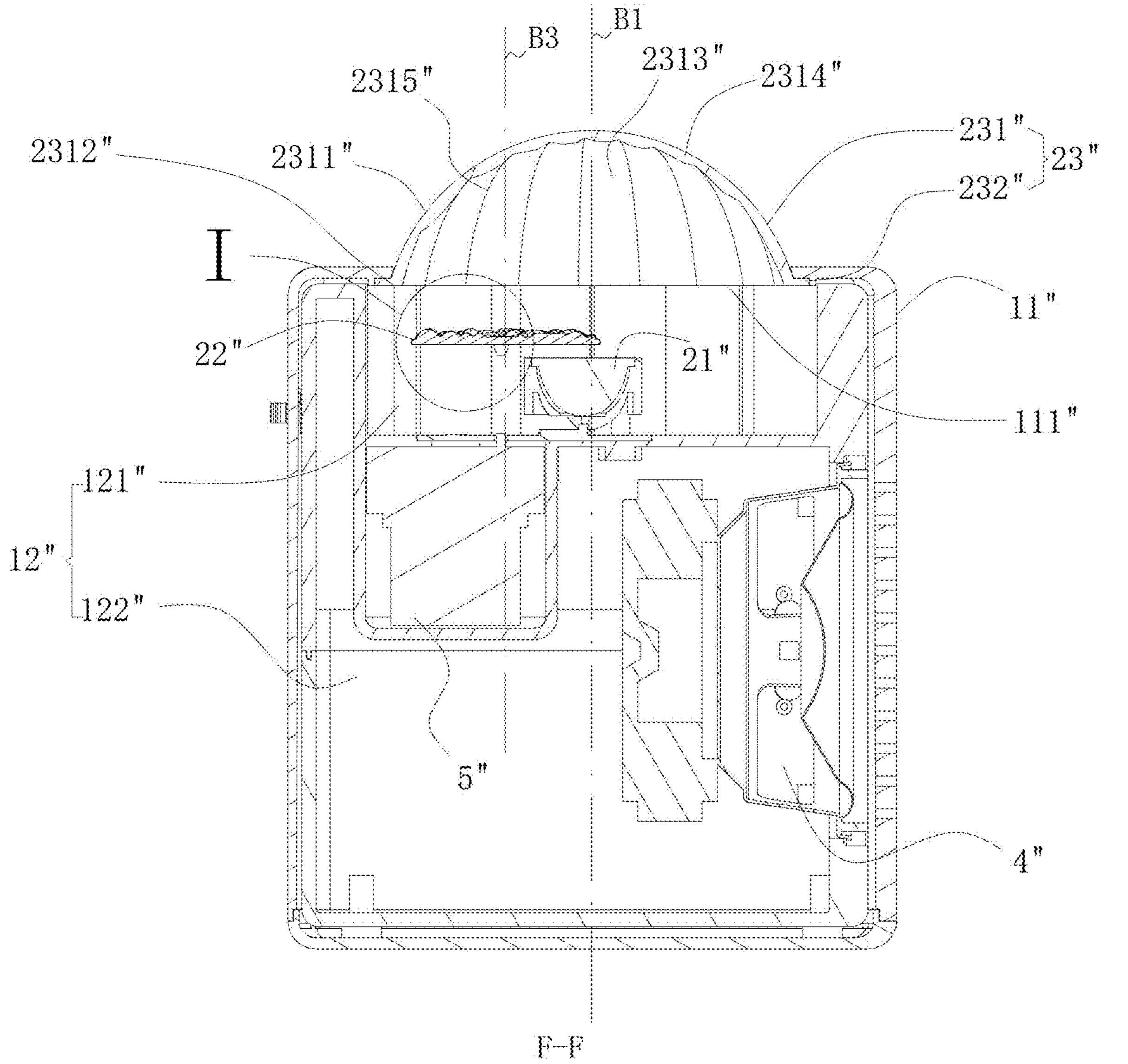
FIG. 16 is a sectional view of FIG. 15 along a section line F-F.

As shown in FIG. 13 and FIG. 16, the base 1" includes an accommodation cavity 12", and a first housing 11" and a second housing that form the accommodation cavity 12". The accommodation cavity 12" includes a first cavity 121" and a second cavity 122" that communicate with each other. The first projection module 2" is accommodated in the first cavity 121", and the audio module 4" is accommodated in the second cavity 122". The first housing 11" includes a projection port 111" passing through an up-down direction, and the projection port 111" communicates with the first cavity 121" in the up-down direction.

Figure 17:
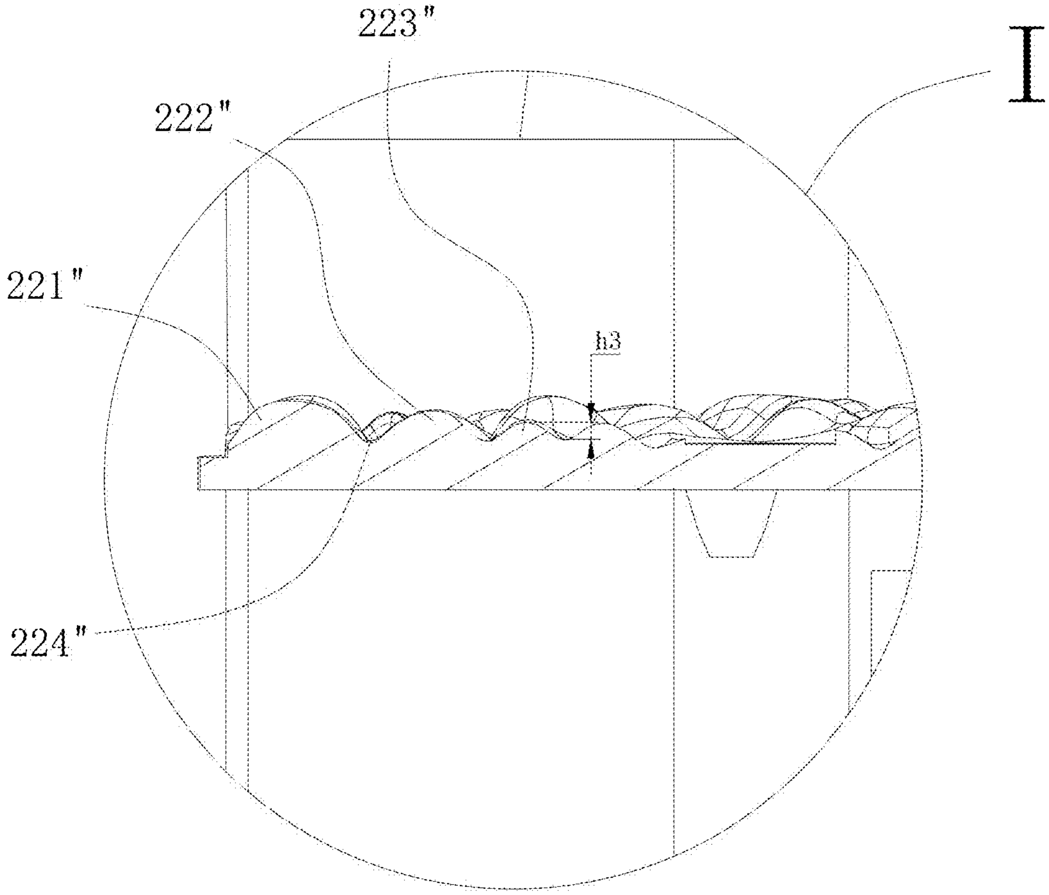
FIG. 17 is a partial enlarged view at I in FIG. 16.

As shown in FIG. 13 and FIG. 17, a central axis of the first projection module 2" is defined as P1. The first projection module 2" includes at least a first light emitter 21" and an optical texture member 22" located above the first light emitter 21". The first light emitter 21" is disposed as a lamp bead. The optical texture member 22" includes at least a plurality of first textures 221", a plurality of second textures 222", a plurality of third textures 223", and a plurality of recess 224" that are disposed at intervals. The recess 224" is located between the first texture 221" and the second texture 222", or the recess 224" is located between the second texture 222" and the third texture 223". A length of the first texture 221" is d1, a length of the second texture 222" is d2, and d1≥d2. Herein, d1 and d2 are lengths of convex textures, and during measurement, a caliper may be placed at the recess 224" at both ends of a convex texture, to obtain a length of the texture. The values of d1 and d2 measured should meet the requirements of the ratio relationship. A height difference between the first texture 221" and its adjacent recess 224" is defined as h1, a height difference between the second texture 222" and its adjacent recess 224" is defined as h2, and h1≥h2. Alternatively, a height difference between the third texture 223" and its adjacent recess 224" as h3, where h1, h2, and h3 are different from each other, or two of h1, h2, and h3 are the same. The height difference between the texture and the recess may be a height difference between any position of the texture and the recess, provided that the foregoing relationship is met. The measurement methods for h1, h2, and h3 are the same as Embodiment 1. Light emitted by the first light emitter 21" is reflected and/or refracted by the optical texture member, to form a plurality of projection areas, and the plurality of projection areas form an ambient light effect. The plurality of projection areas refer to definition of a light effect projection formed by a light beam being reflected and/or refracted by the optical texture member as a plurality of projection areas. The optical texture member may be configured as a texture sheet or a reflector with particles. When a light beam from the first light emitter 21" passes through the texture sheet, light refraction occurs, or when a light beam from the first light emitter 21" passes through the reflector with particles, light reflection occurs. In this embodiment, the first projection module 2" includes the first light emitter 21", the optical texture member 22" located above the first light emitter 21", and at least one optical imaging member 23" located above the optical texture member 22". The optical imaging member 23" is an optical lampshade or an optical lens. A central axis of the optical imaging member 23" is defined as B1, a central axis of the first light emitter 21" is defined as B2, and a central axis of the optical texture member 22" is defined as B3. B2 is parallel to or coincides with B1, B3 is parallel to or coincides with B2, and B3 is parallel to or coincides with B1. When the first projection module 2" projects a long strip light effect pattern, a value range of h1 is 0.8 mm≤h1≤2.6 mm; or when the first projection module 2" projects a cloud or water ripple pattern, a value range of h1 is 0.2 mm≤h1≤0.7 mm. The optical imaging member 23" is detachably mounted on the projection port 111". The optical imaging member 23" and the base 1" form a snap-fit fastening structure or a magnetic fastening structure. The optical lampshade includes a projection portion 231" and a flange 232" disposed around the projection portion 231". The projection portion 231" includes a first contour surface 2311" arranged along a first direction and a second contour surface 2312" arranged along a second direction. The first contour surface 2311" is an outer surface of an optical lampshade or an optical lens. The first contour surface 2311" is connected to the second contour surface 2312". The first contour surface 2311" is an arc-shaped surface or is formed by splicing a plurality of polygonal surfaces. The optical imaging member 23" includes a plurality of imaging lenses 2313" connected to the first contour surface 2311", a separation line 2315" is formed between two adjacent imaging lenses 2313", and the imaging lens 2313" protrudes relative to the separation line 2315". A thickness between the separation line 2315" and the first contour surface 2311" forms a base part of the lampshade. A distance between the separation line 2315" and the first contour surface 2311" is defined as d3, a distance between the imaging lens 2313" and the first contour surface 2311" is defined as d4, and d4 is greater than d3. d3≥0.5 mm, and 1 mm≤d4≤5.8 mm. Values of d3 and d4 may be specifically obtained through measurement after the optical imaging member 23" is cut to form a cross-section 2314", which may be a cross-section at any location of the imaging lens 2313". Light emitted by the first light emitter 21" is reflected and/or refracted by the optical texture member and then passes through the optical imaging member 23", to form a plurality of projection areas, and the plurality of projection areas form an ambient light effect. The plurality of projection areas refer to definition of a light effect projection formed by a light beam being reflected and/or refracted by the optical texture member and then passing through the optical imaging member 23" as a plurality of projection areas. The drive assembly 5" drives the optical texture member 22" to rotate. When an ambient light effect of the first projection module 2" is projected onto a wall, ceiling, or floor in a dark environment, a projected light effect area includes a plurality of non-projection areas and a plurality of projection areas. At least some of the projection areas and some of the non-projection areas are alternately arranged, the projection area moves toward the non-projection area, and a projection position of the projection area gradually changes. A reason for forming the non-projection area is that a part of the light effect is totally reflected in a part of the optical texture member 22", so that a texture at this position does not form an outward projection, and at this position, a color of the wall, ceiling or floor itself is formed. The ambient light effect includes a strong light area and a soft light area arranged around the strong light area. A light beam from the first light emitter 21" passes through the optical texture member and the optical imaging member 23" to form a projection light effect with a central strong light area and a peripheral soft light area, and a proportion of a projection area of the strong light area is greater than that of a projection area of the soft light area.

Figure 14:
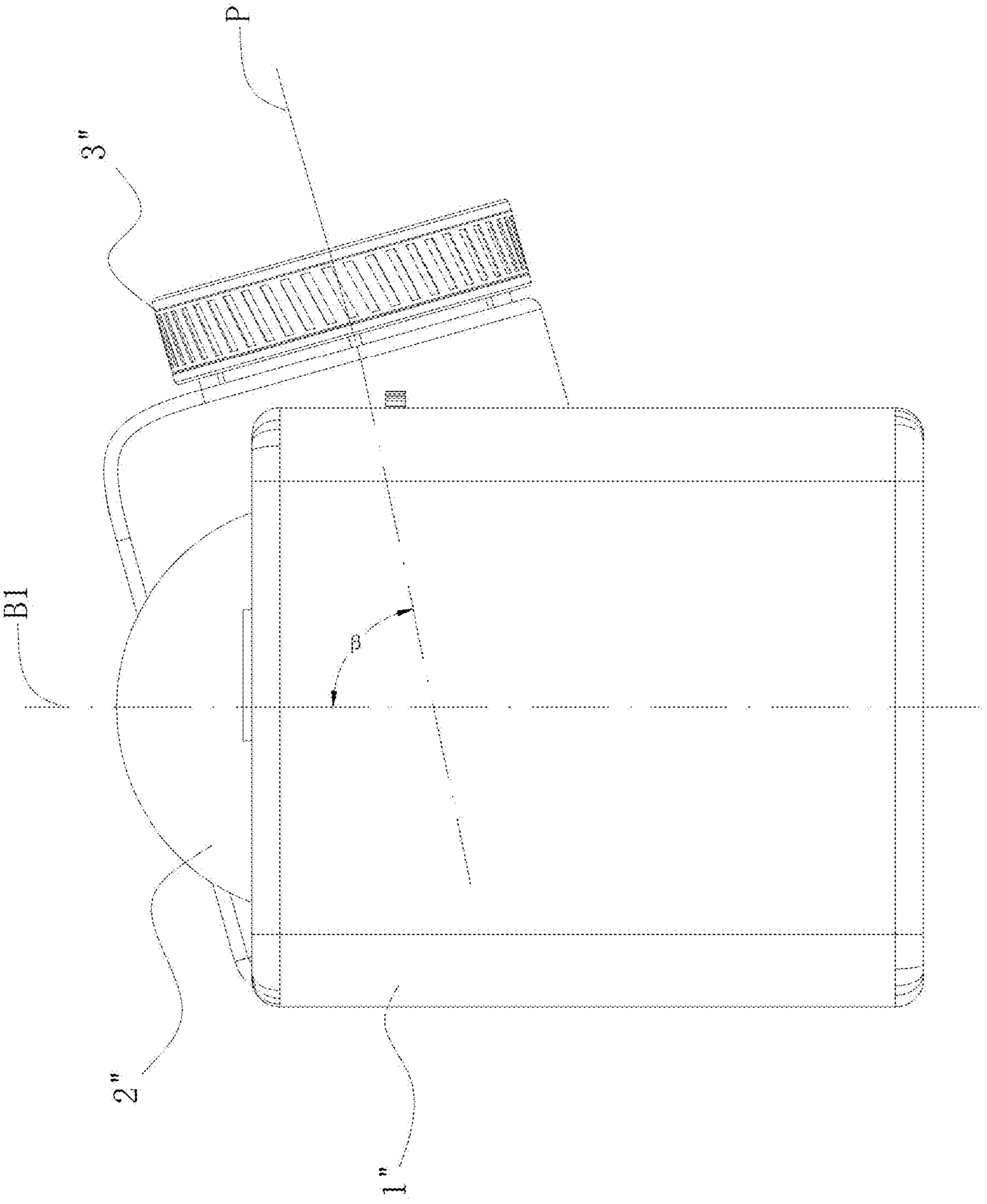
FIG. 14 is a left view of FIG. 13.
Figure 15:
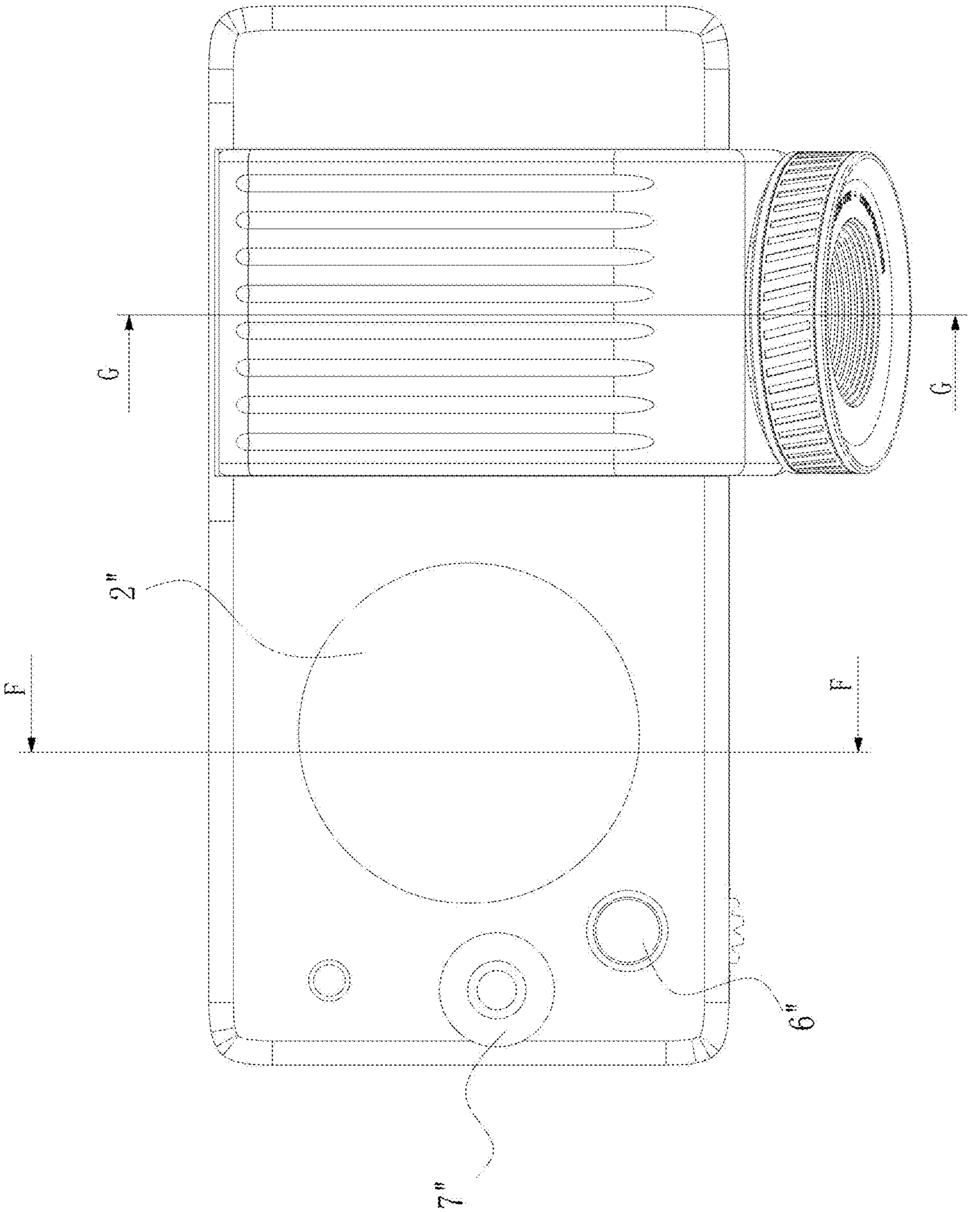
FIG. 15 is a top view of FIG. 13.
Figure 18:
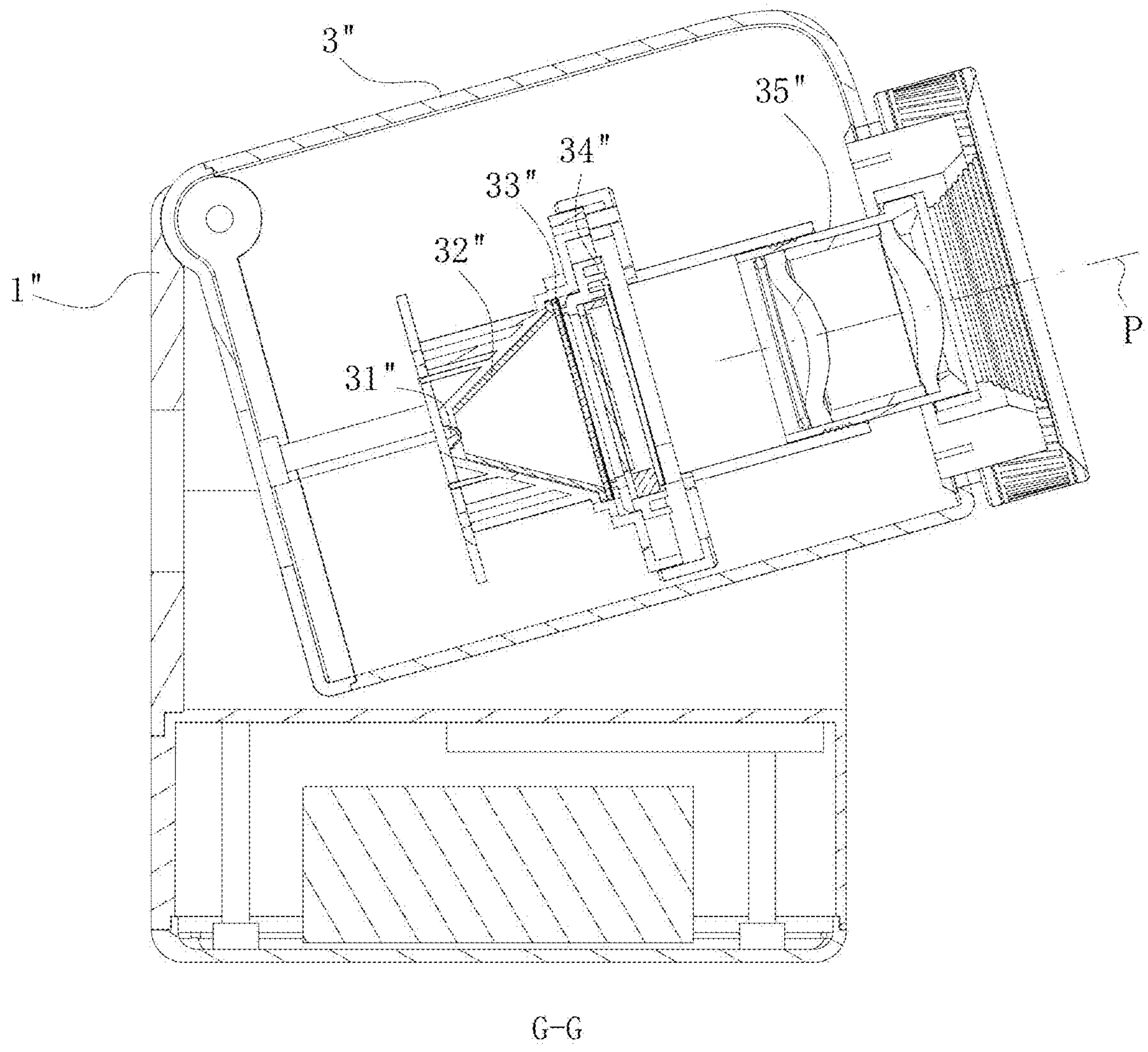
FIG. 18 is a sectional view of FIG. 15 along a section line G-G.

As shown in FIG. 14 and FIG. 18, the second projection module 3" is movably connected to the base 1". A central axis of the second projection module 3" is defined as P2. The second projection module 3" includes at least a second light emitter 31", and a projection screen 33" and an imaging assembly 35" that are located above the second light emitter 31". A central axis of the imaging assembly 35" is defined as P. It may be learned from the left view of FIG. 14 that a minimum included angle formed between P and B1 is β, and a value range of Bis 0°≤β≤180°, and preferably is 22°≤β≤168°. β becomes larger or smaller as the second projection module 3" moves. Light emitted by the second light emitter 31" passes through the projection screen 33" and the imaging assembly 35" to form a lyric or pattern projection. In this embodiment, the second projection module 3" includes at least the second light emitter 31", the optical distribution assembly 32" located above the second light emitter 31", the projection screen 33" located above the optical distribution assembly 32", and the imaging assembly 35". The optical distribution assembly 32" includes a Fresnel lens, a convex lens, or a condenser lens. The projection screen 33" is located between the optical distribution assembly 32" and the imaging assembly 35", or in other words, central axes of the projection screen 33" and the imaging assembly 35" coincide with or are parallel to each other. The second projection module 3" further includes a heat sink 34" disposed around the projection screen 33", the heat sink 34" is a metal heat sink 34", and the heat sink 34" is at least partially in contact with the projection screen 33", to conduct heat away from the projection screen 33". At least a part of the ambient light effect shuttles between two adjacent lyrics. That is, when the ambient light effect of the first projection module 2" is projected onto a wall, ceiling, or floor, the ambient light effect moves to create an effect of shuttling between two lyrics or between two adjacent lines of lyrics. As the ambient light effect moves, a scene in which the ambient light effect moves from far to near over the lyric or pattern projection may be formed. Alternatively, in another embodiment, at least a part of the ambient light effect may be arranged around the lyric or pattern projection. Alternatively, the ambient light effect of the first projection module 2" is used as an ambient background for the lyric or pattern projection, that is, the lyric or pattern projection does not overlap the ambient light effect. The projection apparatus 100" further includes a button function, a remote control function, an APP module, or a mini-program, which controls the first projection module 2" to project a red light effect, a blue light effect, a green light effect, or any combination of the three color light effects, or a rhythmic light effect. Any ambient light effect is adapted to a lyric projection of the second projection module 3".

As shown in FIG. 13, the atmosphere assembly 6" projects a pattern of stars, the moon, or the Milky Way, where a projection position of the atmosphere assembly 6" is closer to a center area of the ambient light effect than a projection position formed by the second projection module 3". In another embodiment, the lyric projection does not overlap with the moon projection, and the moon or star projection at least partially overlaps with the ambient light effect. The projection of the moon or stars is added, so that users can have a feeling of karaoke at night, enhancing the atmosphere. The first projection module 2" is configured to generate and project a projection representing an ambient atmosphere, the second projection module 3" is configured to play related lyric information, and the fragrance assembly 7" is configured to form an olfactory aroma. A system mainboard is coupled to the first projection module 2", the second projection module 3", the audio module 4", and the fragrance assembly 7" to form a multi-sensory combination effect of visual, auditory, and olfactory senses, thereby enhancing an immersive feeling of the atmosphere. Or a system mainboard is coupled to the first projection module 2", the audio module 4", and the fragrance assembly 7".

In conclusion, the projection apparatus in the present invention has the following beneficial effects:

(1) A first projection module 2 includes a first light emitter 21 and an optical texture member located above the first light emitter 21, the optical texture member includes a plurality of textures disposed at intervals and a recess 224 located between two adjacent textures, and the plurality of textures are defined as at least a first texture 221 and a second texture 222; a length of the first texture 221 is d1, a length of the second texture 222 is d2, d1≥d2, and the recess 224 is located between the first texture 221 and the second texture 222; and light emitted by the light emitter passes through the optical texture member to form a plurality of projection areas or light emitted by the light emitter is reflected and/or refracted by the optical texture member to form a plurality of projection areas, the plurality of projection areas form an ambient light effect, and positions of the plurality of projection areas are constantly changing and moving. Different texture lengths make the projection light effect diversified, and improve a stereoscopic feeling of a projection effect, making a projection more realistic.

(2) The ambient light effect includes a strong light area and a soft light area arranged around the strong light area, and the lyric or pattern projection overlaps with the soft light area, which not only creates an atmosphere but also facilitates display of the lyric projection. If the lyric projection is combined with the strong light area, the lyric projection may not be clearly displayed or a higher-power second projection module may be required.

(3) The central axis of the first projection module 2" is P1, the central axis of the second projection module 3" is P2, the minimum included angle formed between P1 and P2 is β, and the value range of β is 0°<β≤180°, so that the ambient light effect of the first projection module 2" is integrated with the ambient light effect of the second projection module 3", providing a karaoke user with a feeling of being in a projected ambient light effect.

(4) The optical imaging member 23 is disposed as an optical lampshade, the optical lampshade includes the first contour surface 2311, and the optical lampshade includes a plurality of imaging lenses 2313 connected to the first contour surface 2311. A separation line 2315 is formed between two adjacent imaging lenses 2313, a distance between the separation line 2315 and the first contour surface 2311 is defined as d1, a distance between the imaging lens 2313 and the first contour surface 2311 is defined as d2, and d2 is greater than d1, thereby enriching imaging textures of the optical lampshade. By combining imaging lenses 2313 of different forms, the projection light effect is enriched.

(5) The height difference between the first texture 221 and its adjacent recess 224 is defined as h1, the height difference between the second texture 222 and its adjacent recess 224 is defined as h2, and h1≥h2; or the optical texture member further includes a third texture 223, the height difference between the first texture 221 and its adjacent recess 224 is defined as h1, the height difference between the second texture 222 and its adjacent recess 224 is defined as h2, the height difference between the third texture 223 and its adjacent recess 224 is defined as h3, where the values of h1, h2, and h3 are all different, or the values of two of h1, h2, and h3 are the same. The textures have different heights, which diversifies projection light effects and enhances three-dimensionality and immersion of the ambient light effect.

(6) When the first projection module 2 projects a long strip light effect pattern, the value range of h1 is 0.8 mm≤h1≤2.6 mm; or when the first projection module 2 projects a cloud or water ripple pattern, the value range of h1 is 0.2 mm≤h1≤0.7 mm. If the height of the texture is too small, it cannot present a three-dimensional effect; or if the height is too large, process costs are high. After a plurality of sets of test data are measured, a suitable numerical range is selected.

The foregoing detailed description is merely a description of example embodiments of the present invention, and is not intended to limit the patent scope of the present invention. Therefore, any equivalent technical variation based on the specification and drawings of this invention shall fall within the scope of the present invention.

What is claimed is:

1. A projection apparatus, comprising:

a first projection module, wherein the first projection module comprises a first light emitter and an optical texture member located above the first light emitter, the optical texture member comprises a plurality of textures disposed at intervals and a recess located between two adjacent textures, and the plurality of textures are defined as at least a first texture and a second texture; a length of the first texture is d1, a length of the second texture is d2, d1≥d2, and the recess is located between the first texture and the second texture; and light emitted by the light emitter passes through the optical texture member to form a plurality of projection areas or light emitted by the light emitter is reflected and/or refracted by the optical texture member to form a plurality of projection areas, the plurality of projection areas form an ambient light effect, and positions of the plurality of projection areas are constantly changing and moving.

2. The projection apparatus according to claim 1, wherein the first projection module further comprises an optical imaging member located above the optical texture member; when the ambient light effect of the first projection module is projected onto a wall, ceiling, or floor in a dark environment, the plurality of projection areas are arranged at intervals, a non-projection area exists between two adjacent projection areas of some of the plurality of projection areas, and the non-projection area is formed by a background wall; and the projection area moves toward the non-projection area, and a projection position of the projection area gradually changes.

3. The projection apparatus according to claim 2, wherein at least a part of a light effect of the projection area moves toward the non-projection area, to gradually cover an area of the non-projection area; or at least a part of a light effect of the projection area moves toward the non-projection area, and an area of the non-projection area gradually changes to another position.

4. The projection apparatus according to claim 1, wherein the base comprises a projection port, the first projection module comprises the optical imaging member mounted on the projection port, the optical imaging member is located above the optical texture member, a light beam from the first light emitter passes through the optical texture member and the optical imaging member to form a projection light effect with a central strong light area and a peripheral soft light area, and a proportion of a projection area of the strong light area is greater than that of a projection area of the soft light area.

5. The projection apparatus according to claim 1, wherein the first projection module comprises an optical imaging member mounted above the optical texture member, the optical imaging member comprises a first contour surface arranged along a first direction and a second contour surface arranged along a second direction, the first contour surface is connected to the second contour surface, and the optical imaging member comprises a plurality of imaging lenses connected to the first contour surface.

6. The projection apparatus according to claim 5, wherein the first contour surface is an arc-shaped surface or is formed by splicing a plurality of polygonal surfaces, a separation line is formed between two adjacent imaging lenses, a distance between the separation line and the first contour surface is defined as d3, a distance between the imaging lens and the first contour surface is defined as d4, and d4 is greater than d3.

7. The projection apparatus according to claim 6, wherein d3≥0.5 mm, and 1 mm≤d4≤5.8 mm.

8. The projection apparatus according to claim 1, wherein a height difference between the first texture and its adjacent recess is defined as h1, a height difference between the second texture and its adjacent recess is defined as h2, and h1≥h2; or the optical texture member further comprises a third texture, a height difference between the first texture and its adjacent recess is defined as h1, a height difference between the second texture and its adjacent recess is defined as h2, a height difference between the third texture and its adjacent recess is defined as h3, values of h1, h2, and h3 are all different, or values of two of h1, h2, and h3 are the same.

9. The projection apparatus according to claim 8, wherein when the first projection module projects a long strip light effect pattern, a value range of h1 is 0.8 mm≤h1≤2.6 mm; or when the first projection module projects a cloud or water ripple pattern, a value range of h1 is 0.2 mm≤h1≤0.7 mm.

10. The projection apparatus according to claim 1, wherein a central axis of the optical imaging member 23 is defined as B1, a central axis of the first light emitter 21 is defined as B2, a central axis of the optical texture member 22 is defined as B3, B2 is parallel to or coincides with B1, B3 is parallel to or coincides with B2, and the B3 is parallel to or coincides with B1.

* * * * *